US012220917B2

(12) United States Patent
Hanagami

(10) Patent No.: US 12,220,917 B2
(45) Date of Patent: Feb. 11, 2025

(54) HEAD UNIT AND LIQUID EJECTING APPARATUS

(71) Applicant: SEIKO EPSON CORPORATION, Tokyo (JP)

(72) Inventor: Taiki Hanagami, Matsumoto (JP)

(73) Assignee: SEIKO EPSON CORPORATION (JP)

(*) Notice: Subject to any disclaimer, the term of this patent is extended or adjusted under 35 U.S.C. 154(b) by 233 days.

(21) Appl. No.: 18/083,890

(22) Filed: Dec. 19, 2022

(65) Prior Publication Data

US 2023/0191785 A1 Jun. 22, 2023

(30) Foreign Application Priority Data

Dec. 20, 2021 (JP) ................................ 2021-205746

(51) Int. Cl.

*B41J 2/14* (2006.01)
*B41J 2/175* (2006.01)
*B41J 2/18* (2006.01)

(52) U.S. Cl.

CPC ........... *B41J 2/14201* (2013.01); *B41J 2/175* (2013.01); *B41J 2/18* (2013.01); *B41J 2002/14241* (2013.01); *B41J 2002/14419* (2013.01); *B41J 2202/19* (2013.01); *B41J 2202/20* (2013.01)

(58) Field of Classification Search

CPC . B41J 2/14201; B41J 2/175; B41J 2/18; B41J 2002/14241; B41J 2002/14419; B41J 2202/19; B41J 2202/20

See application file for complete search history.

(56) References Cited

U.S. PATENT DOCUMENTS 9,962,944 B2 * 5/2018 Kanegae .................. B41J 2/175

FOREIGN PATENT DOCUMENTS

| | | | | |
|---|---|---|---|---|
| JP | 2009012346 A | * | 1/2009 | ................ B41J 3/04 |
| JP | 2021-003845 A | | 1/2021 | |

* cited by examiner

*Primary Examiner* — Geoffrey S Mruk

(74) *Attorney, Agent, or Firm* — Harness, Dickey & Pierce, P.L.C.

(57) ABSTRACT

A head unit includes: heads including a first-head and a second-head including respective flow channels, and a common flow channel member being stacked on the heads and including common flow channels communicating with the heads in common; flexible members including a first-flexible-member disposed between the first-head and the common flow channel member, and a second-flexible-member disposed between the second-head and the common flow channel member; and fixation members for fixing the common flow channel member, the first and second-heads, and the first and second-flexible-members together. The first-flexible-member establishes liquid-tight communication between a first-flow-channel and a first-common-flow-channel by being compressed in a stacking direction. The second-flexible-member establishes liquid-tight communication between a second-flow-channel and the first-common-flow channel by being compressed in the stacking direction. The fixation members include a first-fixation-member disposed between the first-flexible-member and the second-flexible-member in plan view.

15 Claims, 16 Drawing Sheets

HEAD UNIT AND LIQUID EJECTING APPARATUS

The present application is based on, and claims priority from JP Application Serial Number 2021-205746, filed Dec. 20, 2021, the disclosure of which is hereby incorporated by reference herein in its entirety.

BACKGROUND

1. Technical Field

The present disclosure relates to a head unit and a liquid ejecting apparatus.

2. Related Art

There are head units including a liquid ejecting head that ejects a liquid such as an ink. A typical head unit includes flow channel members provided with flow channels in which the liquid flows. The head unit includes flexible members each of which establishes liquid-tight communication between one of the flow channels in the flow channel members with a corresponding flow channel in the liquid ejecting head. For example, a liquid ejecting head described in JP-A-2021-3845 discloses a configuration including bolts and nuts as fixation members for fixing flow channel members and flexible members.

In the related art, for example, the fixation members are located on the outside of a region where the flexible members are disposed in plan view that is viewed in a stacking direction being a direction that reactive force of the flexible members works. According to the above-described related art, fixation force by the fixation members may be insufficient against portions of the flow channel members located in a region surrounded by the fixation members in plan view that is viewed in the stacking direction. When the fixation force by the fixation members is insufficient against the reactive force of the flexible members that acts on the flow channel members, the flow channel members may be deformed and sealing performances by the flexible members may be deteriorated. This may result in leakage of the liquid.

SUMMARY

A head unit according to an aspect of the present disclosure includes: multiple heads including a first head provided with a first flow channel, and a second head located adjacent to the first head and provided with a second flow channel; a common flow channel member being stacked on the multiple heads and being provided with multiple common flow channels including a first common flow channel that communicates with the first and second flow channels; multiple flexible members including a first flexible member disposed between the first head and the common flow channel member, and a second flexible member disposed between the second head and the common flow channel member; and multiple fixation members that couple the common flow channel member to the first and second heads and to the first and second flexible members, in which the first flexible member establishes liquid-tight communication between the first flow channel and the first common flow channel by being compressed in a stacking direction of the multiple heads and the common flow channel member, the second flexible member establishes liquid-tight communication between the second flow channel and the first common flow channel by being compressed in the stacking direction, and the multiple fixation members include a first fixation member disposed between the first flexible member and the second flexible member in plan view being viewed in the stacking direction.

A liquid ejecting apparatus according to another aspect of the present disclosure includes the above-described head unit and a flow channel member on outside of the head unit.

DESCRIPTION OF EXEMPLARY EMBODIMENTS

Figure 1:
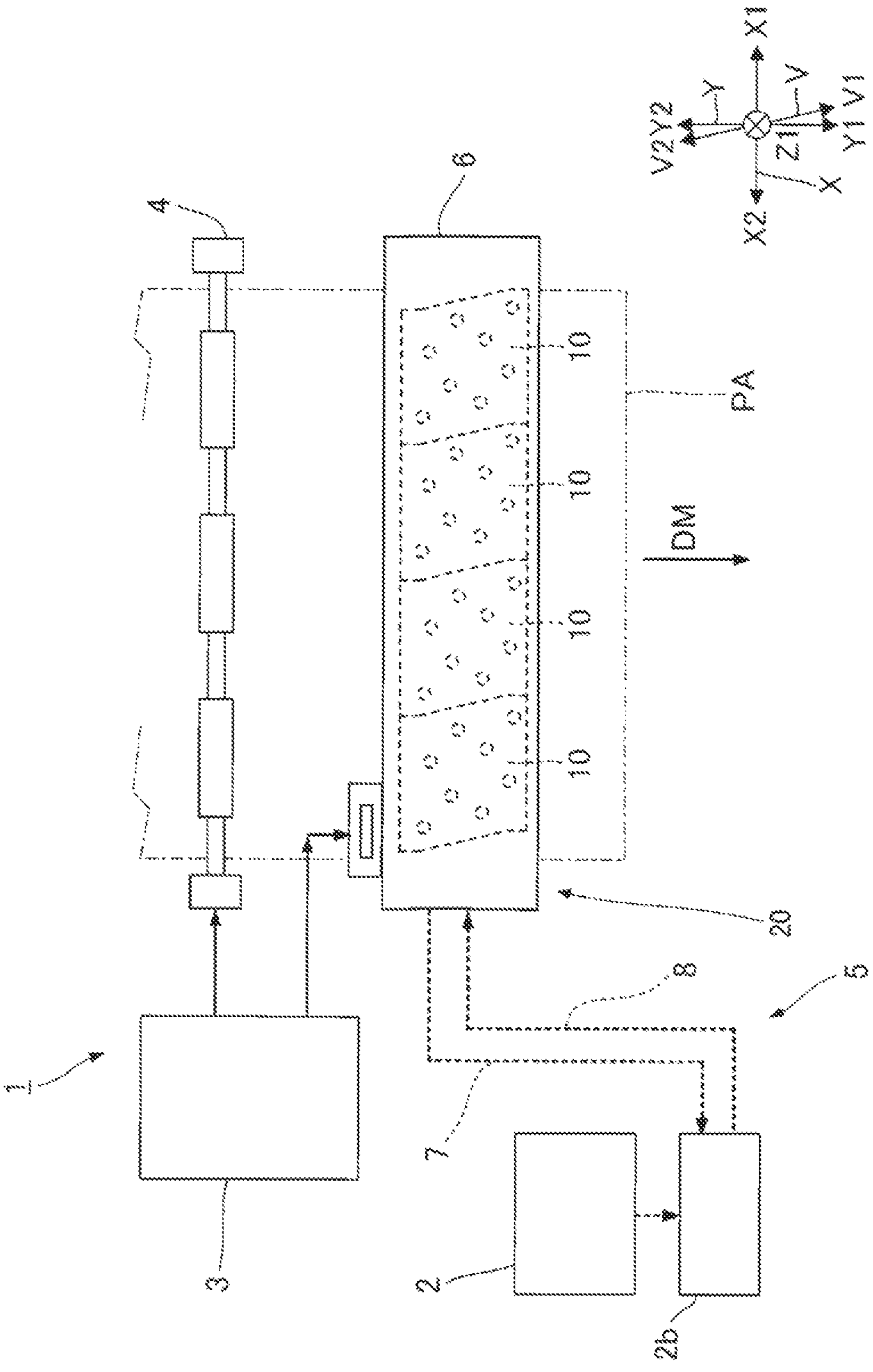
FIG. 1 is a schematic diagram illustrating a liquid ejecting apparatus according to Embodiment 1.

Embodiments of the present disclosure will be described below with reference to the drawings. It is to be noted, however, that dimensions and scales of components in the drawings are different from the actual ones as needed. The embodiments described below represent specific preferred examples of the present disclosure and are therefore provided with various technically desirable limitations. However, the scope of the present disclosure is not limited to these embodiments unless the following description expressly states the specific limitations of the present disclosure.

In the following description, three directions intersecting with one another may be explained as x-axis direction, y-axis direction, and z-axis direction, respectively. The x-axis direction includes x1 direction and x2 direction which are mutually opposite directions. The x-axis direction represents an example of a first direction. The y-axis direction includes y1 direction and y2 direction which are mutually opposite directions. The y-axis direction represents an example of a second direction. The z-axis direction includes z1 direction and z2 direction which are mutually opposite directions. The z-axis direction represents an example of a stacking direction. The x-axis direction, the y-axis direction, and the z-axis direction are orthogonal to one another.

FIG. 1 is a schematic diagram illustrating a liquid ejecting apparatus 1 according to Embodiment 1. The liquid ejecting apparatus 1 is an ink jet type printing apparatus that ejects an ink in the form of droplets, which represents an example of a "liquid", onto a medium PA. The liquid ejecting apparatus 1 of the present embodiment is a so-called line type printing apparatus, in which nozzles that eject an ink are distributed across the entire range in a width direction of the medium PA. The medium PA is typically a sheet of printing paper. The medium PA is not limited only to the printing paper, and may be a printing target of a desired material such as a resin film and a cloth.

As illustrated in FIG. 1, the liquid ejecting apparatus 1 includes a liquid container 2, a control unit 3, a medium transportation mechanism 4, a circulation mechanism 5, and a head unit 20. The head unit 20 includes liquid ejecting heads 10. The liquid ejecting head 10 represent an example of heads.

The liquid container 2 stores an ink. Examples of specific aspects of the liquid container 2 include a cartridge attachable to and detachable from the liquid ejecting apparatus 1, an ink pack in the form of a bag formed from a flexible film, and an ink-refillable ink tank. An arbitrary type of the ink may be stored in the liquid container 2. The liquid container 2 represents an example of a liquid storage unit. The head unit 20 includes liquid containers 2 corresponding to types of the inks. The head unit 20 may be designed to include a single liquid container 2.

The control unit 3 controls operations of respective elements in the liquid ejecting apparatus 1. For example, the control unit 3 includes a processing circuit such as a CPU and an FPGA, and a storage circuit such as a semiconductor memory. The storage circuit stores various programs and various data. The processing circuit executes the programs and achieves a variety of control by using the data as appropriate. The CPU stands for central processing unit. The FPGA stands for field programmable gate array.

The medium transportation mechanism 4 is controlled by the control unit 3 and configured to transport the medium PA in a direction DM of transportation. The medium transportation mechanism 4 includes an elongate transportation roller extending in the width direction of the medium PA, and a motor that rotates the transportation roller. The medium transportation mechanism 4 is not limited only to the structure that uses the transportation roller. For example, the medium transportation mechanism 4 may be designed to use a drum or an endless belt configured to transport the medium PA in a state of being adsorbed onto an outer peripheral surface by use of electrostatic force and the like.

The liquid ejecting head 10 is controlled by the control unit 3 in such a way as to eject the ink, which is supplied from each liquid container 2 through the circulation mechanism 5, from respective nozzles onto the medium PA. The liquid ejecting heads 10 are arranged in a direction intersecting with the direction DM of transportation, thus forming a line head 6.

The ink stored in the liquid container 2 is supplied to each liquid ejecting head 10 through the circulation mechanism 5. The circulation mechanism 5 supplies the ink to the liquid ejecting head 10, and also collects the ink discharged from the liquid ejecting head 10. The circulation mechanism 5 supplies the collected ink to the liquid ejecting head 10 again. The circulation mechanism 5 includes a supply flow channel 7 for supplying the ink to the liquid ejecting head 10, a discharge flow channel 8 for collecting the ink discharged from the liquid ejecting head 10, a sub-tank for storing the collected ink, a pump for transferring the ink, and the like. The supply flow channel 7 and the discharge flow channel 8 are pipes or tubes, for example. The supply flow channel 7 and the discharge flow channel 8 may be structures provided with grooves, recesses, and the like for feeding the liquid.

Figure 2:
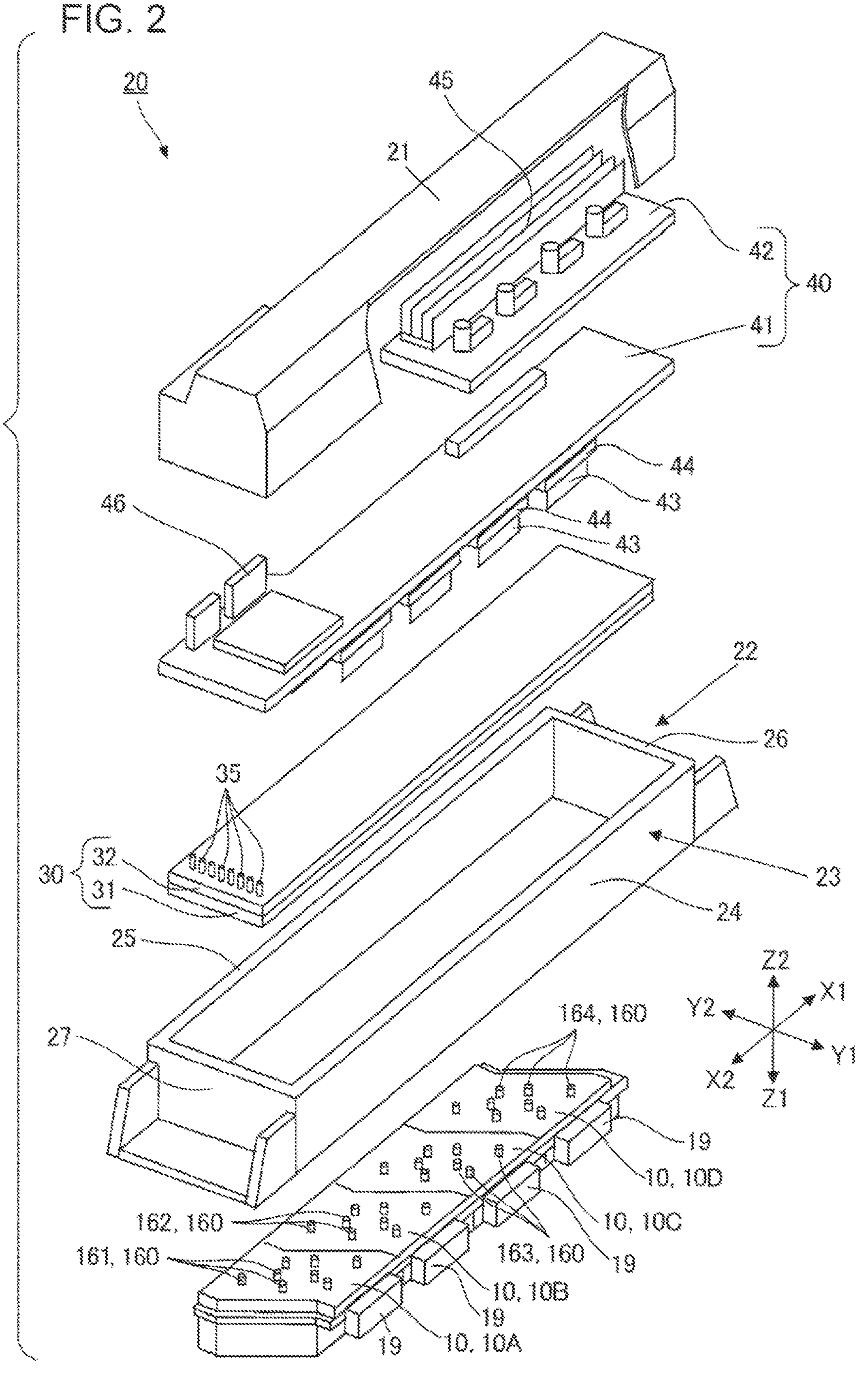
FIG. 2 is an exploded perspective view illustrating a head unit.

Next, the head unit 20 will be described with reference to FIGS. 2 to 8. FIG. 2 is an exploded perspective view illustrating the head unit 20. The head unit 20 includes the liquid ejecting heads 10, a base member 22, a common flow channel member 30, a circuit board unit 40, and a cover 21.

Figure 3:
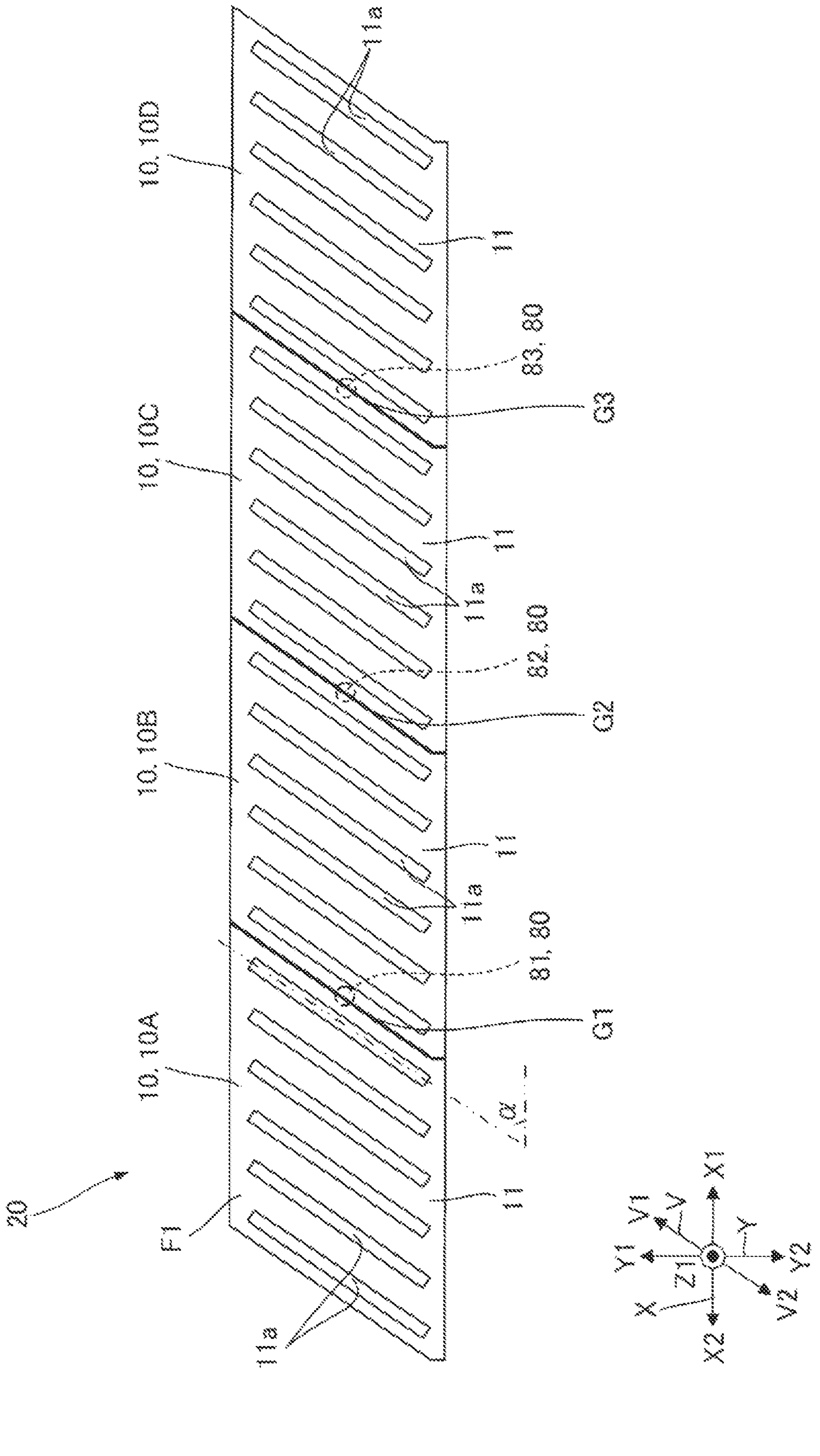
FIG. 3 is a bottom view illustrating an ejection surface of the head unit.

The base member 22 supports the liquid ejecting heads 10 and the common flow channel member 30. The circuit board unit 40 and the cover 21 are fixed to the base member 22. A major part of the liquid ejecting heads 10 are housed in the base member 22. A portion in the z1 direction of the liquid ejecting heads 10 inclusive of an ejection surface F1 thereof is located on the outside of the base member 22. The ejection surface F1 is illustrated in FIG. 3. The ejection surface F1 is exposed to the outside. The common flow channel member 30 is housed in the base member 22.

Figure 4:
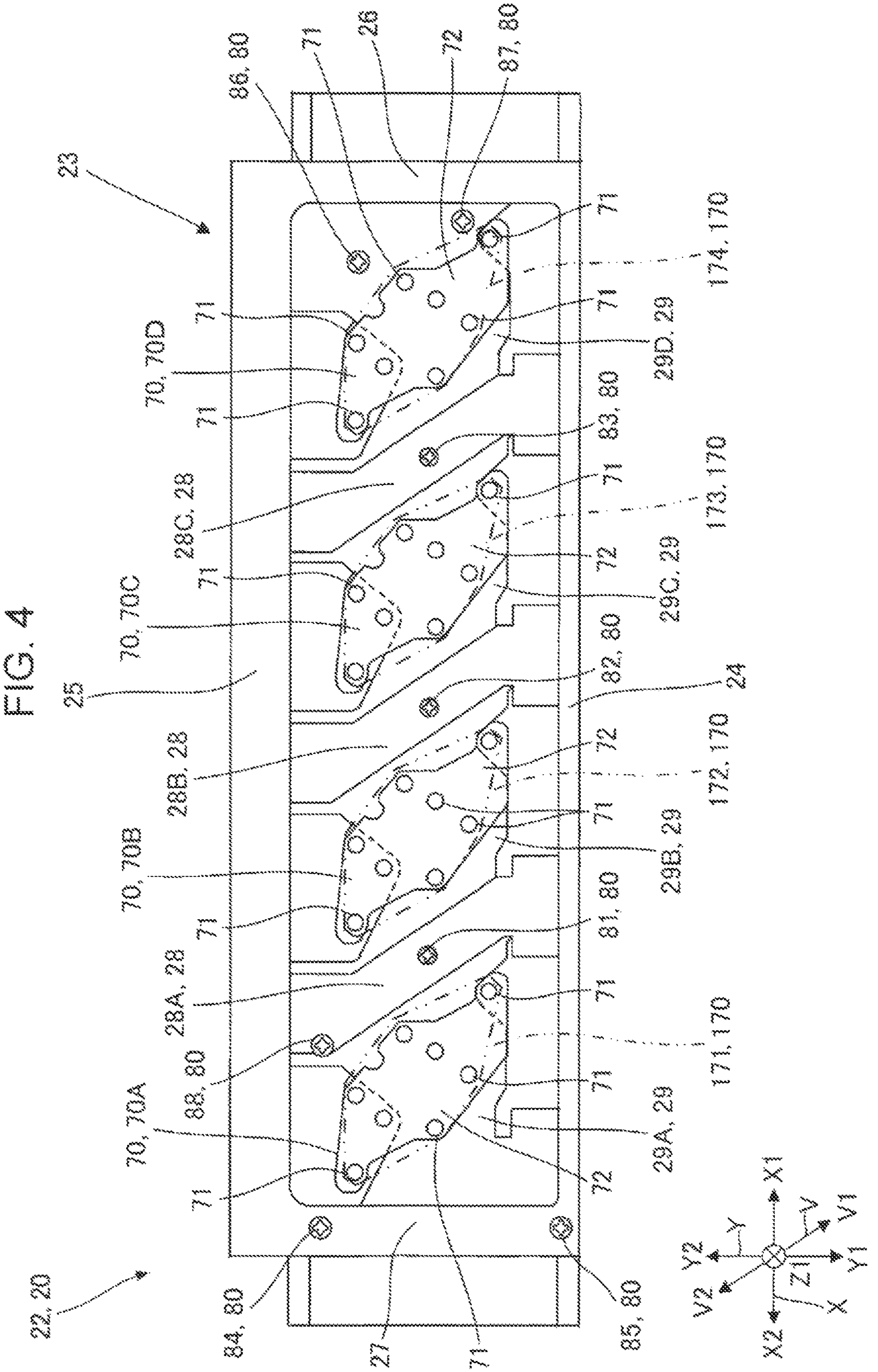
FIG. 4 is a plan view illustrating a base member, flexible members, and fixation members.

The base member 22 includes a frame portion 23. The frame portion 23 is formed into a rectangular shape when viewed in the z-axis direction. The frame portion 23 includes side walls 24 to 27. The side walls 24 and 25 are located away from each other in the y-axis direction. The side wall 24 represents an example of a first side wall. The side wall 25 represents an example of a second side wall. A thickness direction of the side walls 24 and 25 extends in the y-axis direction. The side wall 25 is located in the y2 direction relative to the side wall 24. The side walls 26 and 27 are located away from each other in the x-axis direction. A thickness direction of the side walls 26 and 27 extends in the x-axis direction. The side wall 27 is located in the x2 direction relative to the side wall 26. FIG. 2 omits the illustration of joining portions 28 and supporting portions 29 to be described later. The joining portions 28 and the supporting portions 29 are illustrated in FIG. 4.

The common flow channel member 30 includes common flow channel substrates 31 and 32, for example. A plate thickness direction of the common flow channel substrates 31 and 32 extends in the z-axis direction. The common flow channel substrates 31 and 32 are stacked in the z-axis direction. At least grooves or through holes are formed in the common flow channel substrates 31 and 32. The common flow channel substrate 32 is provided with flow channel pipes 35 that project in the z2 direction. These grooves and through holes constitute flow channels to feed the ink. The common flow channel member 30 is located in the z2 direction relative to the liquid ejecting heads 10. The common flow channel member 30 is located between the circuit board unit 40 and the liquid ejecting heads 10 in the z-axis direction. The common flow channel substrate 31 is located closer in the z-axis direction to the liquid ejecting heads 10 than the common flow channel substrate 32 is. The common flow channel substrate 32 is located in the z2 direction relative to the common flow channel substrate 31. Although the common flow channel member 30 of the present embodiment is formed from the two common flow channel substrates 31 and 32, the common flow channel member 30 may be formed by stacking three or more common flow channel substrates.

Flow channels in the common flow channel member 30 are coupled to the supply flow channel 7 and the discharge flow channel 8 illustrated in FIG. 1 through the flow channel pipes 35. The ink that flows in the supply flow channel 7 further flows in the flow channels in the common flow channel member 30, and is thus supplied to the liquid ejecting heads 10. The ink discharged from the liquid ejecting heads 10 flows in the flow channels in the common flow channel member 30, and thus flows into the discharge flow channel 8. The ink that flows in the discharge flow channel 8 is collected by a sub-tank 2*b*. The common flow channel member 30 provided with common flow channels 50 will be described later with reference to FIG. 5. A coupler portion between a common flow channel 50 in the common flow channel member 30 and a flow channel 60 in the liquid ejecting head 10 will be described later with reference to FIGS. 7 and 8.

The circuit board unit 40 includes a relay board 41 and a control board 42. The relay board 41 is located in the z2 direction relative to the common flow channel member 30. The control board 42 is located in the z2 direction relative to the relay board 41. The relay board 41 and the control board 42 are located away from each other in the z-axis direction. The relay board 41 is fixed to an end portion in the z2 direction of the base member 22, for example. The relay board 41 is fastened to the base member 22 with screws. The control board 42 is fastened to the base member 22 with screws. The relay board 41 is electrically coupled to the control board 42 through not-illustrated wiring. The relay board 41 extends across the liquid ejecting heads 10 in the x-axis direction. The relay board 41 is disposed in such a way as to overlap the liquid ejecting heads 10 when viewed in the z-axis direction.

The relay board 41 is electrically coupled to connectors 19 of liquid ejecting heads 10 through flexible wiring boards 43. The relay board 41 is a rigid board, for example. Each flexible wiring board 43 may be an FFC, for example. The relay board 41 is provided with connectors 44 to be coupled to the flexible wiring boards 43. The connectors 44 of the relay board 41 are disposed on a surface oriented in the z1 direction of the relay board 41.

The control board 42 is provided with one or more IC chips and a heatsink 45. The control board 42 is a rigid board, for example. Each IC chip includes a driving signal generation circuit. The driving signal generation circuit can generate driving signals for driving piezoelectric elements in the liquid ejecting heads 10. The IC chip may also include a step-down circuit or a booster circuit, which is capable of generating a reference voltage signal serving as a reference voltage when the ink is ejected from the liquid ejecting heads 10. The piezoelectric element represents an example of a driving element. The relay board 41 and the control board 42 include the wiring, the connectors, and other electric components. The relay board 41 is provided with a connector 46 to be coupled to electric wiring on the outside of the head unit 20.

The cover 21 is fixed to the base member 22. The cover 21 is fastened to the base member 22 with screws. The cover 21 is disposed in such a way as to cover the relay board 41, the control board 42, and the heatsink 45. Illustration of part of the cover 21 is omitted in FIG. 2.

The liquid ejecting heads 10 include liquid ejecting heads 10A to 10D. The liquid ejecting head 10B is located in the x1 direction relative to the liquid ejecting head 10A. The liquid ejecting head 10C is located in the x1 direction relative to the liquid ejecting head 10B. The liquid ejecting head 10D is located in the x1 direction relative to the liquid ejecting head 10C. Only the locations of the liquid ejecting heads 10A to 10D are different and these liquid ejecting heads have the same structure. The liquid ejecting heads 10A to 10D may be collectively referred to as the liquid ejecting heads 10 when the liquid ejecting heads 10A to 10D need not be distinguished from one another. Each liquid ejecting head 10 represents an example of a head. The liquid ejecting head 10A represents an example of a first head. The liquid ejecting head 10B represents an example of a second head. The liquid ejecting head 10C represents an example of a third head.

Flow channel couplers 161 are provided at a top surface of the liquid ejecting head 10A. The top surface of the liquid ejecting head 10A is a surface located closer to the common flow channel member 30 in the z-axis direction. The flow channel couplers 161 project in the z2 direction. A flow channel to feed the ink is formed inside each flow channel coupler 161. The flow channel couplers 161 include supply flow channel couplers 161 and discharge flow channel couplers 161. The ink that flows in the common flow channel member 30 is supplied to the liquid ejecting head 10A through the supply flow channel couplers 161. The ink discharged from the liquid ejecting head 10A flows into the common flow channel member 30 through the discharge flow channel couplers 161.

Flow channel couplers 162 are provided at a top surface of the liquid ejecting head 10B. Flow channel couplers 163 are provided at a top surface of the liquid ejecting head 10C. Flow channel couplers 164 are provided at a top surface of the liquid ejecting head 10D. These flow channel couplers 162 to 164 have the same structure as the flow channel coupler 161 and explanations thereof will be omitted. The flow channel coupler 161 represents an example of a first flow channel coupler. The flow channel coupler 162 represents an example of a second flow channel coupler.

Figure 9:
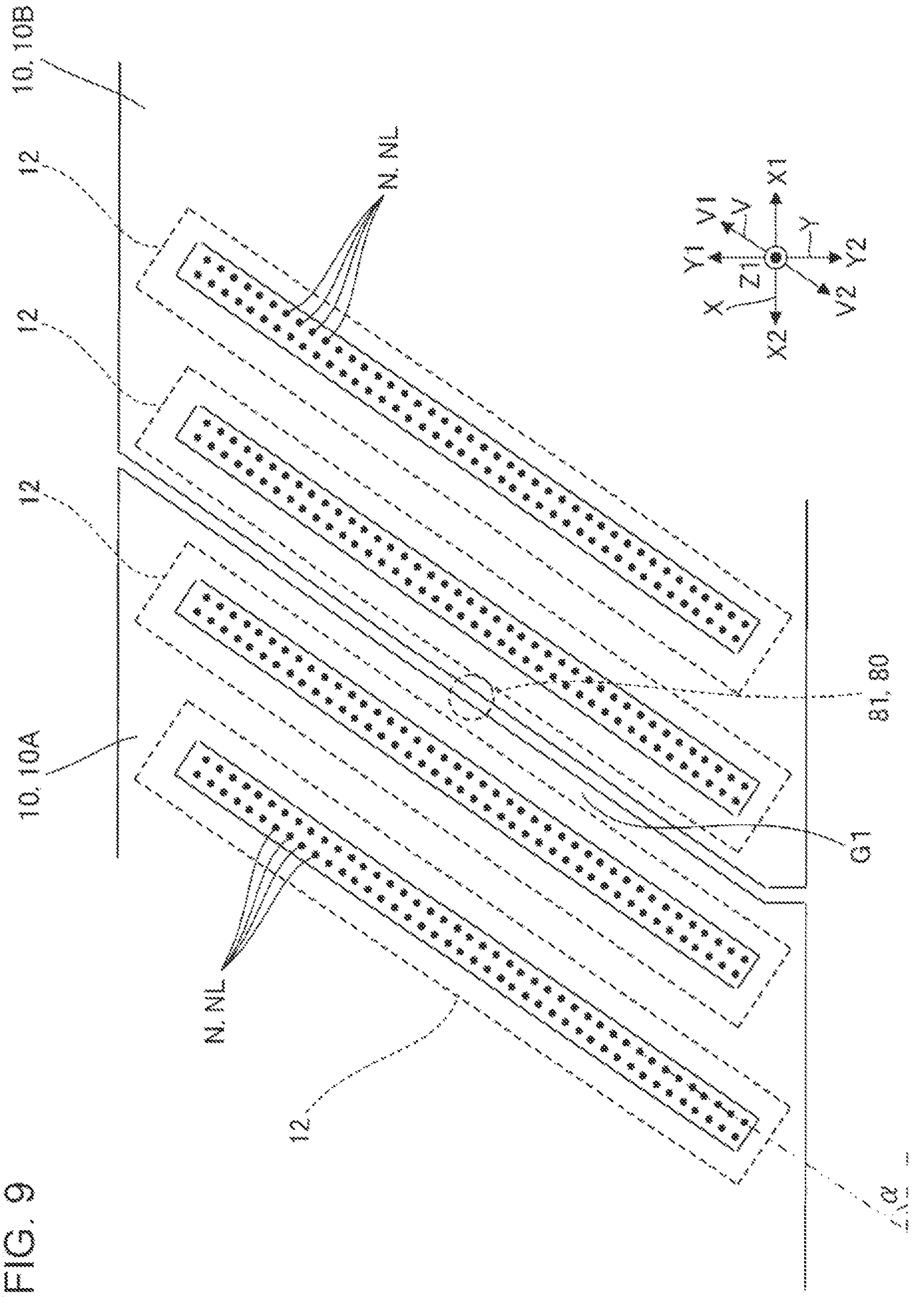
FIG. 9 is a bottom view illustrating a layout of the fixation member located between the liquid ejecting heads.

FIG. 3 is a bottom view illustrating the ejection surface F1 of the head unit 20. Each liquid ejecting head 10 includes head chips 12. The head chips 12 are illustrated in FIG. 9. Each head chip 12 includes nozzles N that eject the ink. The nozzles N form a line NL of nozzles arranged in v-axis direction. The v-axis direction is inclined at a prescribed angle α relative to the x-axis direction. Each liquid ejecting head 10 includes a fixation plate 11 that covers the head chips 12. The fixation plate 11 is provided with openings 11*a*. Each opening 11*a* exposes the nozzles N in the corresponding head chip 12. The opening 11*a* extends in the v-axis direction as with the line NL of nozzles. A surface of the fixation plate 11 oriented in the z1 direction forms the ejection surface F1. A layout of fixation members 81 to 83 is illustrated with dashed lines in FIG. 3. As described later, the fixation members 81 to 83 are fixed to the base member 22 and are not provided to the ejection surface F1.

Figure 6:
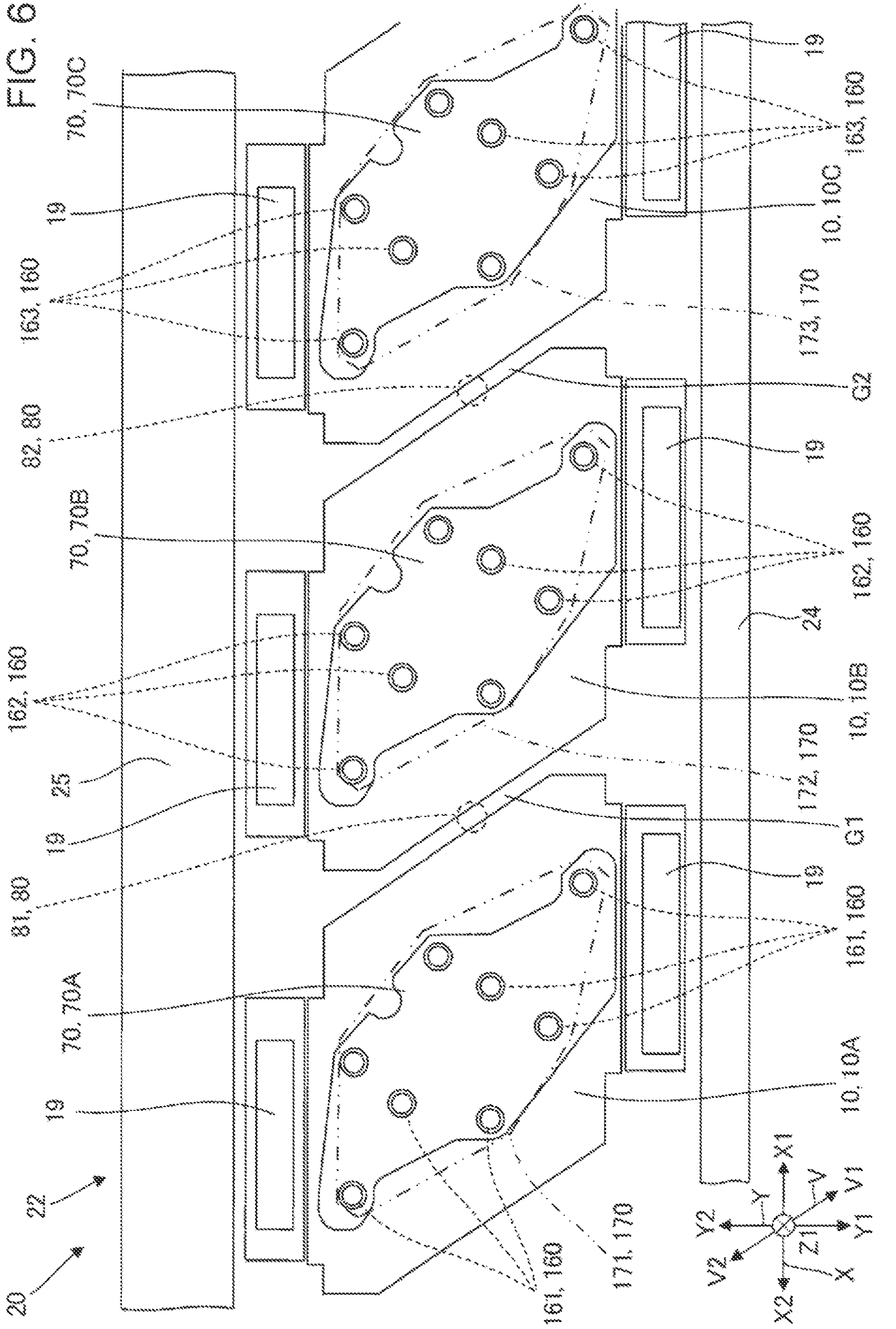
FIG. 6 is a plan view illustrating the base member, liquid ejecting heads, the flexible members, and the fixation members.

Next, the head unit 20 will be described with reference to FIG. 4. FIG. 4 is a plan view illustrating the head unit 20 and flexible members 70. The flexible members 70 include flexible members 70A to 70D. The head unit 20 includes the joining portions 28A to 28C. The joining portions 28A to 28C are joined to the side wall 24 and to the side wall 25. The joining portions 28A to 28C extend in the v-axis direction between the side wall 26 and the side wall 27. The joining portion 28A is disposed corresponding to a gap G1 between the liquid ejecting head 10A and the liquid ejecting head 10B when viewed in the z-axis direction. Gaps G1 to G3 are illustrated in FIG. 3. The gaps G1 and G2 are illustrated in FIG. 6. The joining portion 28A is located in the z2 direction relative to the gap G1. Likewise, the joining portion 28B is disposed corresponding to the gap G2 between the liquid ejecting head 10B and the liquid ejecting head 10C. The joining portion 28B is located in the z2 direction relative to the gap G2. The joining portion 28C is disposed corresponding to the gap G3 between the liquid ejecting head 10C and the liquid ejecting head 10D. The joining portion 28C is located in the z2 direction relative to the gap G3. The joining portions 28A to 28C may be collectively referred to as the joining portions 28 when the joining portions 28A to 28C need not be distinguished from one another. The joining portions 28 are located in the z2 direction relative to the corresponding liquid ejecting heads 10. Each joining portion 28 has a prescribed thickness in the z-axis direction.

The head unit 20 includes supporting portions 29A to 29D. The supporting portion 29A represents an example of a first supporting portion. The supporting portion 29B represents an example of a second supporting portion. The supporting portions 29A to 29D may be collectively referred to as the supporting portions 29 when the supporting portions 29A to 29D need not be distinguished from one another. The supporting portions 29A to 29D are disposed in the z2 direction relative to the corresponding liquid ejecting heads 10 and support the flexible members 70A to 70D, respectively. The supporting portion 29A is located in the z2 direction relative to the liquid ejecting head 10A, and supports the flexible member 70A. The supporting portion 29A is located between the liquid ejecting head 10A and the flexible member 70A in the z-axis direction. The supporting portion 29A is joined to the side wall 27 of the base member 22 and to the joining portion 28A. The supporting portion 29A is provided with openings that allow insertion of the flow channel couplers 161 illustrated in FIG. 2. The flow channel couplers 161 penetrate the supporting portion 29A in the z-axis direction and project in the z2 direction from the supporting portion 29A.

The supporting portion 29B is located in the z2 direction relative to the liquid ejecting head 10B, and supports the flexible member 70B. The supporting portion 29B is located between the liquid ejecting head 10B and the flexible member 70B in the z-axis direction. The supporting portion 29B is joined to the joining portion 28A and to the joining portion 28B. The supporting portion 29B is provided with openings that allow insertion of the flow channel couplers 162.

The supporting portion 29C is located in the z2 direction relative to the liquid ejecting head 10C, and supports the flexible member 70C. The supporting portion 29C is located between the liquid ejecting head 10C and the flexible member 70C in the z-axis direction. The supporting portion 29C is joined to the joining portion 28B and to the joining portion 28C. The supporting portion 29C is provided with openings that allow insertion of the flow channel couplers 163.

The supporting portion 29D is located in the z2 direction relative to the liquid ejecting head 10D, and supports the flexible member 70D. The supporting portion 29D is located between the liquid ejecting head 10D and the flexible member 70D in the z-axis direction. The supporting portion 29D is joined to the joining portion 28C and to the side wall 26. The supporting portion 29D is provided with openings that allow insertion of the flow channel couplers 164.

Openings for exposing the connectors 19 of the liquid ejecting heads 10 are formed between the supporting portions 29 and the side wall 25 in the y-axis direction. The connectors 19 of the liquid ejecting heads 10 are illustrated in FIG. 6. Openings for exposing the connectors 19 of the liquid ejecting heads 10 are formed between the supporting portions 29 and the side wall 24 in the y-axis direction. Each liquid ejecting head 10 includes the connectors 19 that are located away in the y-axis direction. Of the connectors 19, the connector 19 close to the side wall 25 is disposed in such a way as to overlap the opening between the supporting portion 29 and the side wall 25 when viewed in the z-axis direction. Of the connectors 19, the connector 19 close to the side wall 24 is disposed in such a way as to overlap the opening between the supporting portion 29 and the side wall 24 when viewed in the z-axis direction.

The flow channel couplers 161 to 164 formed in the liquid ejecting heads 10A to 10D penetrate the supporting portions 29 and project in the z2 direction. The flow channel couplers 161 to 164 communicate with the common flow channels 50 in the common flow channel member 30.

Figure 5:
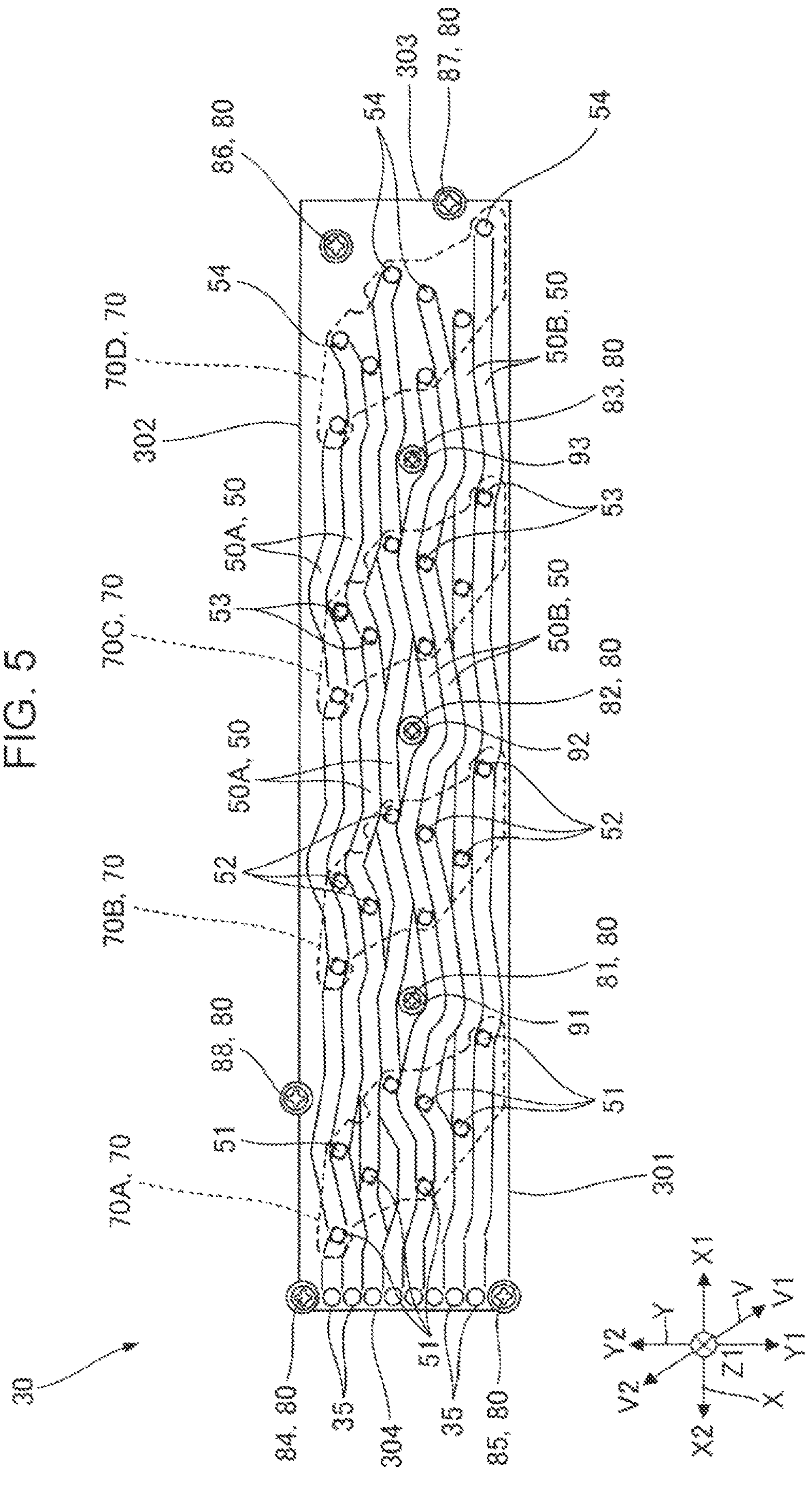
FIG. 5 is a plan view illustrating a common flow channel member and the fixation members.

FIG. 5 is a plan view illustrating the common flow channel member 30 and fixation members 80. FIG. 5 is a plan view that sees through the flexible members 70 and the common flow channels 50 for convenience sake. The common flow channel member 30 is formed substantially into a rectangular shape when viewed in the z-axis direction. In FIG. 5, the flexible members 70 are illustrated with dashed lines. The flexible members 70 are located between the liquid ejecting heads 10 and the common flow channel member 30 in the z-axis direction. The flexible members 70 are located in the z1 direction relative to the common flow channel substrate 31.

The common flow channel member 30 is provided with the common flow channels 50. The common flow channels 50 include a common flow channel 50A and a common flow channel 50B. The common flow channels 50A and 50B may be collectively referred to as the common flow channels 50 when the common flow channels 50A and 50B need not be distinguished from each other.

Figure 7:
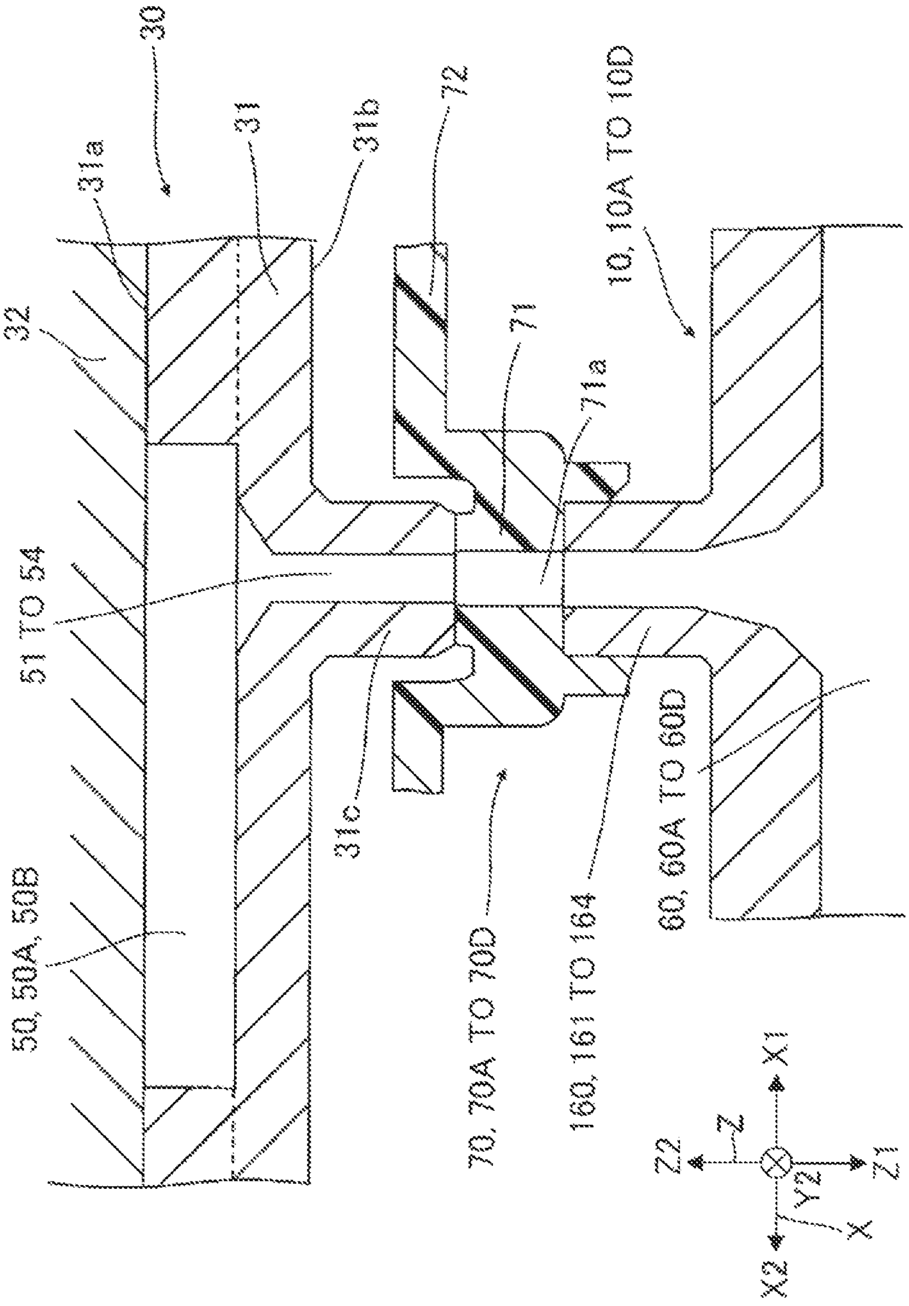
FIG. 7 is a sectional view illustrating the common flow channel member, the flexible member, and a flow channel coupler.

FIG. 7 to be described later in detail illustrates a surface 31*a* of the common flow channel substrate 31, which is located on the opposite side of the liquid ejecting heads 10 in the z-axis direction. Grooves for defining the common flow channels 50A and 50B are formed in the surface 31*a* of the common flow channel substrate 31, and the common flow channels 50 are defined by covering these grooves with the common flow channel substrate 32. Instead, grooves for defining the common flow channels 50 may be formed in a surface of the common flow channel substrate 32 opposed to the surface 31*a* of the common flow channel substrate 31, and the common flow channels 50 may be defined by covering these grooves with the common flow channel substrate 31. Alternatively, the common flow channels 50 may be defined by forming the grooves in both of the common flow channel substrate 31 and the common flow channel substrate 32. The common flow channels 50A and 50B are formed in such a way as to extend in the x-axis direction when viewed in the z-axis direction. The configuration "to extend in the x-axis direction" is not limited only to extension in parallel to the x-axis direction, but also includes an inclination relative to the x-axis direction. The common flow channels 50A and 50B include structures that form flows in the x-axis direction as a whole. The common flow channels 50A and 50B include portions that are formed straight and portions that are curved. The common flow channel 50A represents an example of a first common flow channel. The common flow channel 50B represents an example of a second common flow channel.

The common flow channels 50A and 50B include flow channels 51 to 54 that communicate with flow channels 60A to 60D in the liquid ejecting heads 10. The flow channels 60A to 60D are illustrated in FIG. 7. The flow channels 51 to 54 are formed in such a way as to penetrate the common flow channel substrate 31 in the z-axis direction. The flow channels 51 are provided at positions corresponding to the flow channel couplers 161 of the liquid ejecting head 10A. The flow channels 51 communicate with the flow channels 60A in the liquid ejecting head 10A. The flow channels 52 are provided at positions corresponding to the flow channel couplers 162 of the liquid ejecting head 10B. The flow channels 52 communicate with the flow channels 60B in the liquid ejecting head 10B. The flow channels 53 are provided at positions corresponding to the flow channel couplers 163 of the liquid ejecting head 10C. The flow channels 53 communicate with the flow channels 60C in the liquid ejecting head 10C. The flow channels 54 are provided at positions corresponding to the flow channel couplers 164 of the liquid ejecting head 10D. The flow channels 54 communicate with the flow channels 60D in the liquid ejecting head 10D. Each flow channel 60A represents an example of a first flow channel. Each flow channel 60B represents an example of a second flow channel. Each flow channel 60C represents an example of a third flow channel. The flow channels 60A to 60D may be collectively referred to as the flow channels 60 when the flow channels 60A to 60D need not be distinguished from one another.

FIG. 6 is a plan view illustrating the base member 22, the liquid ejecting heads 10, the flexible members 70, and the fixation members 80. As illustrated in FIGS. 4 to 6, the head unit 20 includes the flexible members 70. As mentioned earlier, the flexible members 70 include the flexible members 70A to 70D. The flexible members 70 are located between the liquid ejecting heads 10 and the common flow channel member 30 in the z-axis direction. The flexible members 70 establish liquid-tight communication between the flow channels 60 of the liquid ejecting heads 10 and the common flow channels 50 of the common flow channel member 30. The flexible members 70 secure sealing between the liquid ejecting heads 10 and the common flow channel member 30. The flexible member 70A represents an example of a first flexible member. The flexible member 70B represents an example of a second flexible member. The flexible member 70C represents an example of a third flexible member.

As illustrated in FIG. 6, the flexible member 70A is located in the z2 direction relative to the liquid ejecting head 10A, and is located between the liquid ejecting head 10A and the common flow channel member 30 in the z-axis direction. The flexible member 70B is located in the z2 direction relative to the liquid ejecting head 10B, and is located between the liquid ejecting head 10B and the common flow channel member 30 in the z-axis direction. The flexible member 70C is located in the z2 direction relative to the liquid ejecting head 10C, and is located between the liquid ejecting head 10C and the common flow channel member 30 in the z-axis direction. The flexible member 70D illustrated in FIG. 4 is located between the liquid ejecting head 10D and the common flow channel member 30, and is located between the liquid ejecting head 10D and the common flow channel member 30 in the z-axis direction.

Figure 8:
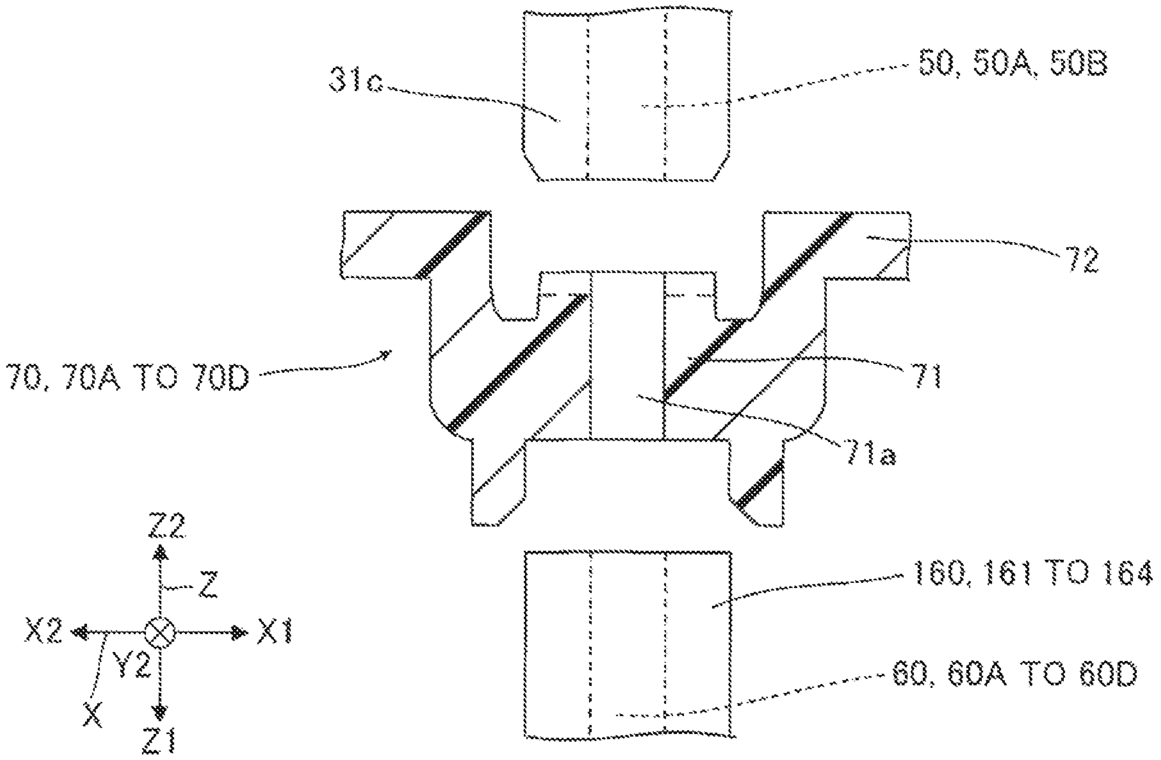
FIG. 8 is a sectional view illustrating a sealing portion of the flexible member before attachment.

Next, a sealing portion 71 of the flexible member 70 will be described with reference to FIGS. 7 and 8. FIG. 7 is a sectional view illustrating the common flow channel member 30, the flexible member 70, and a flow channel coupler 160. FIG. 8 is a sectional view illustrating the sealing portion 71 of the flexible member 70 before attachment. The flexible member 70 includes the sealing portions 71 and a plate portion 72. The sealing portions 71 are provided at positions corresponding to the flow channel couplers 160 of the liquid ejecting head 10.

The common flow channel substrate 31 is also provided with flow channel joining portions 31*c* that project from a surface 31*b* oriented in the z1 direction. The flow channel joining portions 31*c* are provided at the positions corresponding to the flow channel couplers 160 of the liquid ejecting head 10 when viewed in the z-axis direction. The sealing portions 71 are disposed between the flow channel joining portions 31*c* of the common flow channel substrate 31 and the flow channel couplers 160 of the liquid ejecting heads 10 in the z-axis direction.

Each sealing portion 71 is formed into a disc shape. A flow channel 71*a* is formed at a central part of the sealing portion 71. The flow channel 71*a* establishes communication between the common flow channel 50 of the common flow channel member 30 and the flow channel 60 of the liquid ejecting head 10. The sealing portion 71 has a prescribed thickness in the z-axis direction. The flexible member 70 is made of a resin, for example. The flexible member 70 has elasticity and is compressed in the z-axis direction. The sealing portion 71 is pinched between the flow channel joining portion 31*c* and the flow channel coupler 160, and is compressed in the z-axis direction. Thus, the sealing portion 71 establishes the liquid-tight communication between the common flow channel 50 and the flow channel 60.

The plate portion 72 joins the sealing portions 71 to one another. A thickness direction of the plate portion 72 coincides with the z-axis direction. The thickness of the sealing portions 71 is larger than the thickness of the plate portion 72, for example. The sealing portions 71 are located in the z1 direction relative to the plate portion 72. The sealing portions 71 may protrude in the z2 direction from the plate portion 72.

Next, the fixation member 80 will be described. As illustrated in FIGS. 3 to 6, the head unit 20 includes the fixation members 80. The fixation members 80 include the fixation members 81 to 88. The fixation member 81 represents an example of a first fixation member. The fixation member 82 represents an example of a second fixation member. The fixation members 80 are fixed to the base member 22. The fixation members 80 can fix the flexible members 70 to the liquid ejecting heads 10 by fixing the common flow channel member 30 illustrated in FIG. 5 to the base member 22. The flexible members 70 located between the liquid ejecting heads 10 and the common flow channel member 30 in the z-axis direction are pressed in the z1 direction by the common flow channel member 30. Accordingly, the sealing portions 71 of the flexible members 70 are compressed in the z-axis direction as illustrated in FIG. 7, thereby establishing the liquid-tight communication of the flow channels between the common flow channel member 30 and the liquid ejecting heads 10. The liquid tightness includes a state of maintaining the sealing performances of the flow channels so as to suppress ink leakage.

Each fixation member 80 is a screw, for example. The base member 22 being a fixation target of the fixation members 80 is provided with female screw portions to be engaged with the screws. The fixation members 80 are not limited only to the screws, but may include other components such as nuts, pins, springs, and clamps.

Positional relations of the fixation members 80 with the base member 22 will be described with reference to FIG. 4. The fixation member 81 is fixed to the joining portion 28A. The fixation member 82 is fixed to the joining portion 28B. The fixation member 83 is fixed to the joining portion 28C.

The fixation members 84 and 85 are fixed to the side wall 27. The fixation members 86 and 87 are fixed to the supporting portion 29D. The fixation member 88 is fixed to the joining portion 28A.

The fixation members 81 to 83 are disposed at central parts of the joining portions 28 in the y-axis direction. The fixation members 81 to 83 are disposed at the same position in the y-axis direction. The fixation member 88 is located in the y2 direction relative to the fixation members 81 to 83. The fixation member 88 is disposed at a position closer to the side wall 25 than the fixation member 81 is and closer to the side wall 27 than the fixation member 81 is.

The fixation members 84 and 85 are disposed at the same position in the x-axis direction. The fixation member 84 is disposed at a position closer to the side wall 25 than the fixation member 85 is. The fixation member 84 is located in the y2 direction relative to the fixation members 81 to 83 in the y-axis direction. The fixation member 85 is located in the y1 direction relative to the fixation members 81 to 83 in the y-axis direction. The fixation member 85 may be disposed at the same position as the side wall 24 in the y-axis direction.

The fixation members 86 and 87 are located between the side wall 24 and the side wall 25 in the y-axis direction. The fixation member 86 is disposed at a position closer to the side wall 25 than the fixation member 83 is in the y-axis direction. The fixation member 87 is disposed at a position closer to the side wall 24 than the fixation member 83 is in the y-axis direction. The fixation members 86 and 87 are disposed at positions closer to the side wall 26 than the fixation member 83 is in the x-axis direction. The fixation member 87 is located closer to the side wall 27 than the fixation member 86 is in the x-axis direction. The fixation members 86 and 87 are located in the x2 direction relative to the side wall 26.

Next, positional relations of the fixation members 80 with the common flow channel member 30 will be described with reference to FIG. 5. The common flow channel member 30 is formed substantially into a rectangular shape when viewed in the z-axis direction. A longitudinal direction of the common flow channel member 30 extends in the x-axis direction. The common flow channel member 30 includes sides 301 to 304 that form its outer shape. The sides 301 and 302 extend in the x-axis direction. The sides 303 and 304 extend in the y-axis direction.

The sides 301 and 302 are located away from each other in the y-axis direction. The side 302 is located in the y2 direction relative to the side 301. The sides 303 and 304 are located away from each other in the x-axis direction. The side 303 is located in the x1 direction relative to the side 304.

The fixation members 81 to 83 are located between the side 301 and the side 302 in the y-axis direction. The fixation members 81 to 83 may be disposed at intermediate positions between the side 301 and the side 302 in the y-axis direction. The fixation members 81 to 83 are located between the side 303 and the side 304 in the x-axis direction. The fixation member 82 may be disposed at an intermediate position between the side 303 and the side 304 in the x-axis direction.

The fixation member 84 is located at an end portion in the x2 direction of the side 302. The fixation member 84 is located at an end portion in the y2 direction of the side 304. The fixation member 85 is located at an end portion in the x2 direction of the side 301. The fixation member 85 is located at an end portion in the y1 direction of the side 304.

The fixation member 86 is located on the inner side of an interesting point of the side 302 and the side 303 of the common flow channel member 30. Specifically, the fixation member 86 is located in the y1 direction relative to the side 302 and is located in the x2 direction relative to the side 303. The fixation member 87 is disposed at a position overlapping the side 303 when viewed in the z-axis direction.

The common flow channel member 30 is provided with eight common flow channels 50 in the y-axis direction, for example. Four common flow channels 50A are formed close to the side 302 and four common flow channels 50B are formed close to the side 301. The fixation members 81 to 83 are located between the common flow channels 50A and the common flow channels 50B in the y-axis direction.

Figure 10:
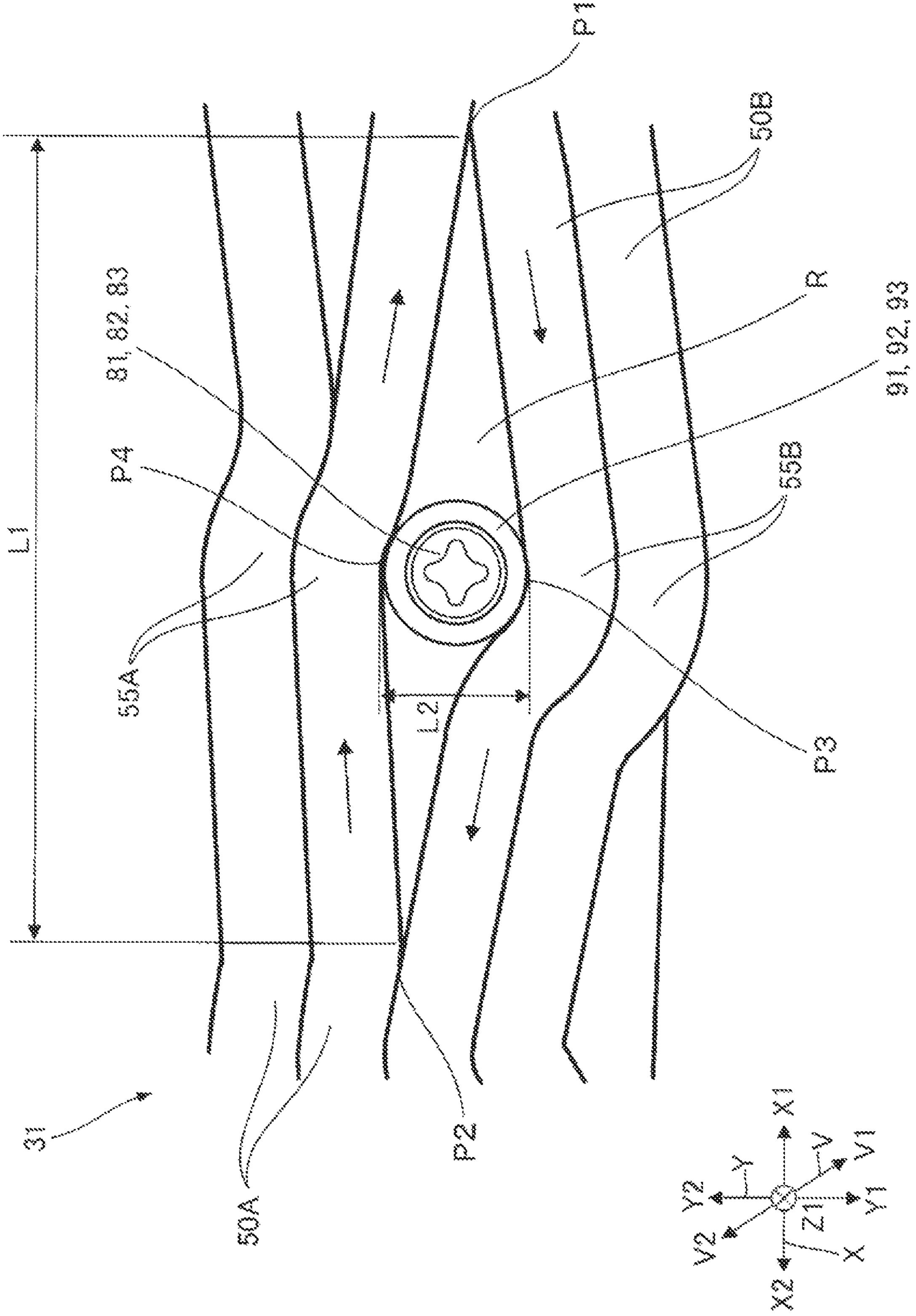
FIG. 10 is a plan view illustrating bypass portions in common flow channels and the fixation member.

FIG. 10 is a plan view illustrating bypass portions 55A and 55B in the common flow channels 50 and illustrating the fixation member 81. As illustrated in FIG. 10, a fixation hole 91 is formed between the common flow channels 50A and the common flow channels 50B. The fixation hole 91 penetrates the common flow channel member 30 in the z-axis direction. The fixation member 81 is inserted into the fixation hole 91 and is fixed to the base member 22.

Each common flow channel 50A includes a bypass portion 55A, which is bent in such a way as to bypass the fixation hole 91. The bypass portion 55A is bent at a position in the y2 direction relative to the fixation hole 91. The bypass portion 55A may be curved along an arc of the fixation hole 91. The bypass portion 55A may include portions having different curvatures. The bypass portion 55A represents an example of a first bypass portion. In FIG. 10, directions of flow of the ink are indicated with arrows. The directions of flow of the ink are not limited only to the directions indicated with the arrows. The directions of flow of the ink may be changed as appropriate. In the common flow channel 50A, a length of a straight portion located in the x2 direction relative to the bypass portion 55A may be different from a length of a straight portion located in the x1 direction relative to the bypass portion 55A.

Each common flow channel 50B includes a bypass portion 55B, which is bent in such a way as to bypass the fixation hole 91. The bypass portion 55B is bent at a position in the y1 direction relative to the fixation hole 91. The bypass portion 55B may be curved along the arc of the fixation hole 91. The bypass portion 55B may include portions having different curvatures. The bypass portion 55B represents an example of a second bypass portion. In the common flow channel 50B, a length of a straight portion located in the x1 direction relative to the bypass portion 55B may be different from a length of a straight portion located in the x2 direction relative to the bypass portion 55B.

Likewise, the common flow channel member 30 is provided with a fixation hole 92 that allows insertion of the fixation member 82. Each common flow channel 50A includes a bypass portions 55A, which is bent in such a way as to bypass the fixation hole 92. Each common flow channel 50B includes a bypass portions 55B, which is bent in such a way as to bypass the fixation hole 92. The common flow channel member 30 is provided with a fixation hole 93 that allows insertion of the fixation member 83. Each common flow channel 50A includes a bypass portions 55A, which is bent in such a way as to bypass the fixation hole 93. Each common flow channel 50B includes a bypass portions 55B, which is bent in such a way as to bypass the fixation hole 93. The bypass portions 55A and 55B corresponding to the fixation member 81, the bypass portions 55A and 55B corresponding to the fixation member 82, and the bypass portions 55A and 55B corresponding to the fixation member 83 have substantially the same structure. Accordingly, reference signs for the fixation members 82 and 83 and for the fixation holes 92 and 93 are indicated in FIG. 10 for convenience sake.

A region R is formed between the common flow channel 50A and the common flow channel 50B. The fixation hole 91 is formed in the region R and the fixation member 81 is disposed therein. The "region R" represents an example of a "region surrounded by the common flow channels 50A and 50B adjacent to each other and designed to dispose the fixation member 81".

A dimension L1 in the x-axis direction of the region R is larger than a dimension L2 in the y-axis direction of the region R. The dimension L1 is equivalent to a distance in the x-axis direction between an end portion P1 and an end portion P2 of the region R. The end portion P1 is an end portion in the x1 direction of the region R. The end portion P2 is an end portion in the x2 direction of the region R. The common flow channel 50A is located away from the common flow channel 50B in the y-axis direction between the end portion P1 and the end portion P2. The dimension L2 is equivalent to a distance in the y-axis direction between an end portion P3 and an end portion P4 of the region R. The end portion P3 is an end portion in the y1 direction of the region R. The end portion P4 is an end portion in the y2 direction of the region R. The dimension L1 may be a length equal to or more than twice as large as the dimension L2, or may be a length equal to or more than three times as large as the dimension L2. Nonetheless, the dimension L1 may be equal to or shorter than the dimension L2.

A region in which the fixation member 82 is disposed can also be formed in the same way as the region R in which the fixation member 81 is disposed. A region in which the fixation member 83 is disposed may also be formed in the same way as the region R in which the fixation member 81 is disposed. The region in which the fixation member 83 is disposed may be formed continuously to the side 303 in the x1 direction of the common flow channel substrate 31. In other words, a clearance may be formed between the common flow channel 50A and the common flow channel 50B at a position in the x1 direction from the fixation member 83.

Next, positional relations of the fixation members 80 with the flexible members 70 will be described with reference to FIGS. 4 to 6. The fixation member 81 is located between the flexible member 70A and the flexible member 70B in the x-axis direction. The fixation member 81 is located in a region where the flexible members 70A and 70B are disposed in the y-axis direction. The fixation member 81 is disposed in such a way as to overlap the flexible members 70A and 70B when viewed in the x-axis direction. In other words, the fixation member 81 is not disposed on the outside of the flexible members 70A and 70B when viewed in the x-axis direction.

The fixation member 82 is located between the flexible member 70B and the flexible member 70C in the x-axis direction. The fixation member 82 is located in a region where the flexible members 70B and 70C are disposed in the y-axis direction. The fixation member 82 is disposed in such a way as to overlap the flexible members 70B and 70C when viewed in the x-axis direction. In other words, the fixation member 82 is not disposed on the outside of the flexible members 70B and 70C when viewed in the x-axis direction.

The fixation member 83 is located between the flexible member 70C and the flexible member 70D in the x-axis direction. The fixation member 83 is located in a region where the flexible members 70C and 70D are disposed in the y-axis direction. The fixation member 83 is disposed in such a way as to overlap the flexible members 70C and 70D when viewed in the x-axis direction. In other words, the fixation member 83 is not disposed on the outside of the flexible members 70C and 70D when viewed in the x-axis direction.

The fixation members 84 and 85 are located in the x2 direction relative to the flexible member 70A. The fixation member 84 is located in the y2 direction relative to the flexible member 70A. The fixation member 85 is located in the y1 direction relative to the flexible member 70A.

The fixation members 86 and 87 are located between the flexible member 70D and the side wall 27 in the x-axis direction. The fixation members 86 and 87 are disposed at positions overlapping the flexible member 70D when viewed in the x-axis direction. The fixation members 86 and 87 are disposed at positions overlapping the flexible member 70D when viewed in the y-axis direction.

The fixation member 88 is located in the y2 direction relative to the flexible member 70A in the x-axis direction. The fixation member 88 is located in a region where the flexible member 70A is disposed in when viewed in the y-axis direction.

Next, positional relations of the fixation members 81 to 83 with the liquid ejecting heads 10 will be described with reference to FIGS. 3, 6, and 9. FIG. 9 is a bottom view illustrating a layout of the fixation member 80 located between the liquid ejecting heads 10. The fixation member 81 is located at a position overlapping the gap G1 between the liquid ejecting head 10A and the liquid ejecting head 10B when viewed in the z-axis direction. The fixation member 82 is located at a position overlapping the gap G2 between the liquid ejecting head 10B and the liquid ejecting head 10C. The fixation member 83 is located at a position overlapping the gap G3 between the liquid ejecting head 10C and the liquid ejecting head 10D.

Next, positional relations of the fixation members 80 with regions 171 to 174 will be described with reference to FIGS. 4 and 6. The region 171 represents an example of a first region. The region 172 represents an example of a second region. The region 171 is a region that surrounds the flow channel couplers 161 of the liquid ejecting head 10A. All of the flow channel couplers 161 are disposed in the region 171. The region 171 may be a region to surround all of the flow channel coupler 161 with the smallest area. The region 171 is a region that surrounds the flow channel couplers 161 among the flow channel couplers 161, which are located on the outermost ends in the x-axis direction and the y-axis direction. In other words, the region 171 can be defined as the smallest convex polygon that encompasses all of the flow channel couplers 161. Likewise, the region 172 is a region that surrounds the flow channel couplers 162 of the liquid ejecting head 10B. All of the flow channel couplers 162 are disposed in the region 172. The region 173 is a region that surrounds the flow channel couplers 163 of the liquid ejecting head 10C. All of the flow channel couplers 163 are disposed in the region 173. The region 174 is a region that surrounds the flow channel couplers 164 of the liquid ejecting head 10D. All of the flow channel couplers 164 are disposed in the region 174.

The fixation member 81 is located between the region 171 and the region 172 when viewed in the z-axis direction. The fixation member 82 is located between the region 172 and the region 173 when viewed in the z-axis direction. The fixation member 83 is located between the region 173 and the region 174 when viewed in the z-axis direction. The fixation members 81 to 83 are disposed in such a way as to overlap the regions 171 to 173 when viewed in the x-axis direction.

The fixation members 84 and 85 are located in the x2 direction relative to the region 171. The fixation members 84 and 85 are located on the outside of the region 171 when viewed in the x-axis direction.

The fixation members 86 and 87 are disposed at positions overlapping the region 174 when viewed in the x-axis direction. The fixation members 86 and 87 are disposed at positions overlapping the region 174 when viewed in the y-axis direction.

As described above, the head unit 20 according to the Embodiment 1 includes the liquid ejecting heads 10. The liquid ejecting heads 10 include the liquid ejecting head 10A provided with the flow channels 60A, and the liquid ejecting head 10B located adjacent to the liquid ejecting head 10A and provided with the flow channels 60B. The head unit 20 includes the common flow channel member 30. The common flow channel member 30 is stacked on the liquid ejecting heads 10. The common flow channel member 30 is provided with the common flow channels 50, which include the common flow channels 50A that communicate with the flow channels 60A and 60B. The head unit 20 includes the flexible members 70. The flexible members 70 include the flexible member 70A disposed between the liquid ejecting head 10A and the common flow channel member 30, and the flexible member 70B disposed between the liquid ejecting head 10B and the common flow channel member 30. The head unit 20 includes the fixation members 80. The fixation members 80 fix the common flow channel member 30 to the liquid ejecting heads 10A and 10B and to the flexible members 70A and 70B. The flexible member 70A establishes the liquid-tight communication between the flow channel 60A and the common flow channel 50A by being compressed in the z-axis direction along the stacking direction of the liquid ejecting heads 10 and the common flow channel member 30. The flexible member 70B establishes the liquid-tight communication between the flow channel 60B and the common flow channel 50A by being compressed in the z-axis direction. The fixation members 80 include the fixation member 81 disposed between the flexible member 70A and the flexible member 70B in plan view that is viewed in the z-axis direction.

According to the above-described head unit 20, the fixation member 81 is disposed between the flexible member 70A and the flexible member 70B when viewed in the z-axis direction. In other words, the fixation member 81 is disposed in the vicinity of a position where reactive force originates from the flexible members 70A and 70B.

Accordingly, even when the reactive force originates from the flexible members 70A and 70B, the flexible members 70A and 70B are pressed against the liquid ejecting heads 10A and 10B, thereby reducing a risk of ink leakage in contrast to the configuration in which the fixation member 81 is not disposed between the flexible members 70A and 70B.

The liquid ejecting heads 10 include the liquid ejecting head 10C, which is adjacent to the liquid ejecting head 10B and is provided with the flow channels 60C. The flexible members 70 include the flexible member 70C. The flexible member 70C is disposed between the liquid ejecting head 10C and the common flow channel member 30 and is compressed in the z-axis direction. Thus, the flexible member 70C establishes the liquid-tight communication between the flow channels 60C and the common flow channel 50. The fixation members 80 include the fixation member 82. The fixation member 82 is disposed between the flexible member 70B and the flexible member 70C in plan view. In the head unit 20, the fixation member 82 is disposed between the flexible member 70B and the flexible member 70C when viewed in the z-axis direction. Accordingly, even when the reactive force originates from the flexible members 70B and 70C in the head unit 20, a risk of ink leakage can be reduced by pressing the flexible members 70B and 70C against the liquid ejecting heads 10B and 10C.

Likewise, the liquid ejecting heads 10 include the liquid ejecting head 10D, which is adjacent to the liquid ejecting head 10C and is provided with the flow channels 60D. The flexible members 70 include the flexible member 70D. The flexible member 70D is disposed between the liquid ejecting head 10D and the common flow channel member 30 and is compressed in the z-axis direction. Thus, the flexible member 70D establishes the liquid-tight communication between the flow channels 60D and the common flow channel 50. The fixation members 80 include the fixation member 83. The fixation member 83 is disposed between the flexible member 70C and the flexible member 70D in plan view.

The fixation member 81 overlaps the gap G1 between the liquid ejecting head 10A and the liquid ejecting head 10B in plan view. According to the head unit 20 configured as described above, it is possible to cause fastening force with the fixation member 81 to evenly act on liquid ejecting heads 10A and 10B disposed on two sides of the fixation member 81. Thus, the flexible members 70A and 70B can be evenly pressed against the liquid ejecting heads 10A and 10B. As a consequence, it is possible to reduce a variation in fastening force against the liquid ejecting heads 10A and 10B.

Likewise, the fixation member 82 overlaps the gap G2 between the liquid ejecting head 10B and the liquid ejecting head 10C in plan view.

Similarly, the fixation member 83 overlaps the gap G3 between the liquid ejecting head 10C and the liquid ejecting head 10D in plan view.

The liquid ejecting heads 10A and 10B are arranged in the x-axis direction. The common flow channel 50A extends in the x-axis direction. The common flow channel member 30 includes the fixation hole 91 that allows insertion of the fixation member 81. The common flow channel 50A includes the bypass portion 55A that is bent in such a way as to bypass the fixation hole 91 between the flexible member 70A and the flexible member 70B in plan view. The portion of the common flow channel 50A adjacent to the fixation hole 91 is the bypass portion 55A. Provision of the bypass portion 55A makes it possible to dispose the fixation member 81 between the flexible members 70A and 70B that are adjacent to each other.

Likewise, the liquid ejecting head 10B and 10C are arranged in the x-axis direction. The common flow channel 50A extends in the x-axis direction. The common flow channel member 30 includes the fixation hole 92 that allows insertion of the fixation member 82. The common flow channel 50A includes the bypass portion 55A that is bent in such a way as to bypass the fixation hole 92 between the flexible member 70B and the flexible member 70C in plan view.

Similarly, the liquid ejecting head 10C and 10D are arranged in the x-axis direction. The common flow channel 50A extends in the x-axis direction. The common flow channel member 30 includes the fixation hole 93 that allows insertion of the fixation member 83. The common flow channel 50A includes the bypass portion 55A that is bent in such a way as to bypass the fixation hole 93 between the flexible member 70C and the flexible member 70D in plan view.

The common flow channels 50 include the common flow channel 50B that is different from the common flow channel 50A and extends in the x-axis direction. The common flow channel 50B includes the bypass portion 55B that is bent in such a way as to bypass the fixation hole 91 between the flexible member 70A and the flexible member 70B in plan view. The fixation hole 91 is pinched between the bypass portion 55A and the bypass portion 55B in plan view. The portion of the common flow channel 50B adjacent to the fixation hole 91 is the bypass portion 55B. Provision of the bypass portion 55A and the bypass portion 55B that bypass on mutually opposite sides in the y-axis direction as described above makes it possible to secure the space for disposing the fixation hole 91 in the common flow channel member 30. Thus, the fixation member 81 can be disposed between the flexible member 70A and the flexible member 70B. As compared to a degree of bending of a bypass portion in a configuration to provide the bypass portion only on one side of the common flow channel 50A or the common flow channel 50B, it is possible to reduce the degree of bending of each of the bypass portions 55A and 55B in the configuration to provide the common flow channels 50A and 50B with the bypass portions 55A and 55B, respectively. Accordingly, the flow of the ink inside the common flow channels 50A and 50B provided with the bypass portions 55A and 55B is less likely to be blocked, thereby avoiding reduction in performance of discharging bubbles in the ink.

Likewise, the common flow channel 50B includes the bypass portion 55B that is bent in such a way as to bypass the fixation hole 92 between the flexible member 70B and the flexible member 70C in plan view. The fixation hole 92 is pinched between the bypass portion 55A and the bypass portion 55B in plan view.

Similarly, the common flow channel 50B includes the bypass portion 55B that is bent in such a way as to bypass the fixation hole 93 between the flexible member 70C and the flexible member 70D in plan view. The fixation hole 93 is pinched between the bypass portion 55A and the bypass portion 55B in plan view.

The dimension L1 in the x-axis direction of the region R, in which the fixation members 81 to 83 are disposed and which is surrounded by the common flow channels 50A and 50B adjacent to each other, is larger than the dimension L2 in the y-axis direction thereof. By forming the common flow channels 50A and 50B in such a way as to surround the region R as described above, it is possible to gently curve the common flow channels 50A and 50B so as not to block the flow of the ink in the common flow channels 50A and 50B. As a consequence, the reduction in performance of discharging bubbles in the ink that flows in the common flow channels 50A and 50B is avoided.

The head unit 20 includes the base member 22 that holds the liquid ejecting heads 10A and 10B. In plan view, an outer shape of the flexible member 70A is smaller than an outer shape of the liquid ejecting head 10A, and an outer shape of the flexible member 70B is smaller than an outer shape of the liquid ejecting head 10B. The base member 22 includes the frame portion 23 provided with the side wall 24 and the side wall 25 that are located away from each other, and the joining portion 28A that extends between the flexible member 70A and the flexible member 70B in such a way as to couple the side wall 24 to the side wall 25. The fixation member 81 directly fixes the joining portion 28A to the common flow channel member 30. According to the above-described head unit 20, the joining portion 28A is provided between the flexible members 70A and 70B, so that the fixation member 81 can be attached to this joining portion 28A. Accordingly, it is possible to fix the fixation member 81 between the flexible members 70A and 70B, thereby fixing the flexible members 70A and 70B through the common flow channel member 30.

Likewise, the head unit 20 includes the base member 22 that holds the liquid ejecting heads 10B and 10C. In plan view, the outer shape of the flexible member 70B is smaller than the outer shape of the liquid ejecting head 10B, and an outer shape of the flexible member 70C is smaller than an outer shape of the liquid ejecting head 10C. The base member 22 includes the frame portion 23 provided with the side wall 24 and the side wall 25 that are located away from each other, and the joining portion 28B that extends between the flexible member 70B and the flexible member 70C in such a way as to couple the side wall 24 to the side wall 25. The fixation member 82 directly fixes the joining portion 28B to the common flow channel member 30.

Similarly, the head unit 20 includes the base member 22 that holds the liquid ejecting heads 10C and 10D. In plan view, the outer shape of the flexible member 70C is smaller than the outer shape of the liquid ejecting head 10C, and an outer shape of the flexible member 70D is smaller than an outer shape of the liquid ejecting head 10D. The base member 22 includes the frame portion 23 provided with the side wall 24 and the side wall 25 that are located away from each other, and the joining portion 28C that extends between the flexible member 70C and the flexible member 70D in such a way as to couple the side wall 24 to the side wall 25. The fixation member 83 directly fixes the joining portion 28C to the common flow channel member 30.

The base member 22 includes the supporting portion 29A on which the flexible member 70A is mounted, and the supporting portion 29B on which the flexible member 70B is mounted. The above-described head unit 20 can support the flexible member 70A with the supporting portion 29A and support the flexible member 70B with the supporting portion 29B. Since the base member 22 includes supporting portions 29A and 29B, the base member 22 can increase rigidity and suppress deformation of the base member 22. As a consequence, it is possible to further reduce the risk of ink leakage by decreasing deformation of the flexible members 70A and 70B attributed to the deformation of the base member 22.

Likewise, the base member 22 includes the supporting portion 29C on which the flexible member 70C is mounted, and the supporting portion 29D on which the flexible member 70D is mounted.

The head unit 20 is the line head formed by arranging the liquid ejecting heads 10 in the x-axis direction. The liquid ejecting heads 10 need to be provided in order to form this head unit 20, and the number of the flexible members 70 is also increased corresponding to the liquid ejecting heads 10. When the number of the flexible members 70 is increased, the reactive force originating from the flexible members 70 grows larger and the common flow channel member 30 is more likely to be deformed. However, according to the head unit 20 of the Embodiment 1, it is possible to suppress release of the sealing by the flexible members 70 even when the flexible members 70 are disposed between the liquid ejecting heads 10 and the common flow channel member 30, thereby reducing the risk of ink leakage.

The fixation members 80 include the fixation members 84 to 87, which are disposed on the outside of the flexible members 70 in plan view. Each of the fixation members 81 to 83 is smaller than each of the fixation members 84 to 87 in plan view. Each of the fixation members 84 to 87 represents an example of a third fixation member. Note that the outside of the flexible members 70 means a position not overlapping the flexible members 70 in plan view, which is also a position located between the flexible members. The "small fixation member" includes a state of a smaller outside diameter of a screw head and a state of a smaller outer diameter of a screw shaft, for example. In the above-described head unit 20, the smaller fixation members 81 to 83 are disposed between the flexible members 70. According to the head unit 20, it is possible to reduce the risk of ink leakage by effectively using a space between the flexible members 70 and fixing the flexible members 70 by disposing the fixation members 81 to 83 therein. Note that the fixation members 81 to 83 are not limited only to the smaller members than the fixation members 84 to 87, but may be members of the same size as the fixation members 84 to 87 or larger members than the fixation members 84 to 87.

The liquid ejecting head 10A includes the flow channel couplers 161 to be coupled to the common flow channels 50. The liquid ejecting head 10B includes the flow channel couplers 162 to be coupled to the common flow channels 50. The fixation member 81 is disposed between the region 171 that surrounds the flow channel couplers 161 and the region 172 that surrounds the flow channel couplers 162 when viewed in the z-axis direction. According to the above-described head unit 20, the fixation member 81 is disposed between the region 171 and the region 172. In the meantime, the fixation member 81 is not disposed on the outside of the regions 171 and 172 in the y-axis direction. Since the fixation member 81 is disposed at the position between the regions 171 and 172 in the x-axis direction and at the position not deviating from the regions 171 and 172 in the y-axis direction, it is possible to cause clamping force of the fixation member 81 to surely act on the flexible members 70A and 70B. As a consequence, the sealing performance is improved and the risk of ink leakage is reduced.

The liquid ejecting head 10C includes the flow channel couplers 163 to be coupled to the common flow channels 50. The fixation member 82 is disposed between the region 172 that surrounds the flow channel couplers 162 and the region 173 that surrounds the flow channel couplers 163 when viewed in the z-axis direction. According to the above-described head unit 20, the fixation member 82 is disposed between the region 172 and the region 173. In the meantime, the fixation member 82 is not disposed on the outside of the regions 172 and 173 in the y-axis direction.

The liquid ejecting head 10D includes the flow channel couplers 164 to be coupled to the common flow channels 50. The fixation member 83 is disposed between the region 173 that surrounds the flow channel couplers 163 and the region 174 that surrounds the flow channel couplers 164 when viewed in the z-axis direction. According to the above-described head unit 20, the fixation member 83 is disposed between the region 173 and the region 174. In the meantime, the fixation member 83 is not disposed on the outside of the regions 173 and 174 in the y-axis direction.

Figure 11:
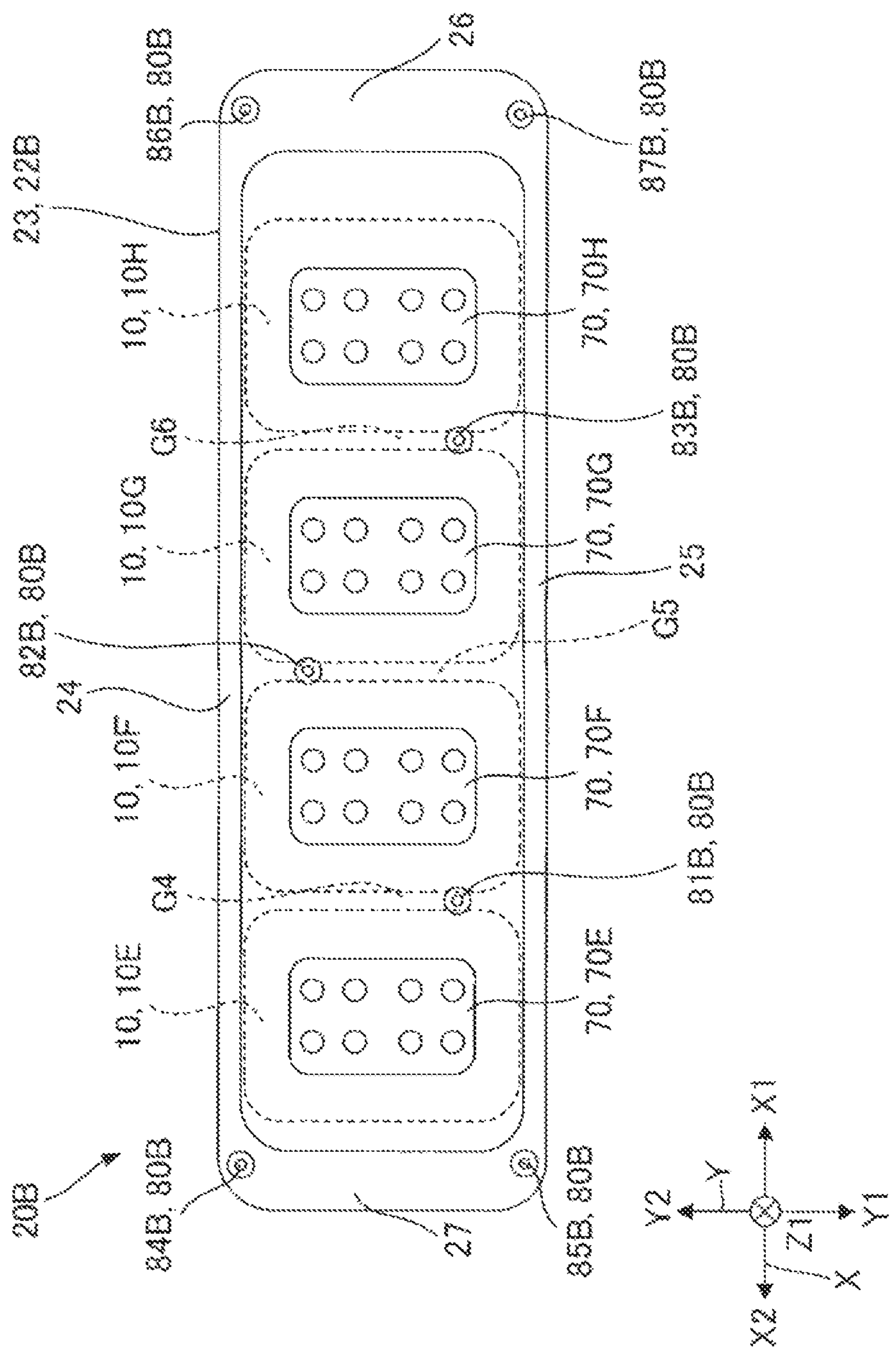
FIG. 11 is a schematic plan view illustrating a head unit according to Embodiment 2.

Next, a head unit 20B according to Embodiment 2 will be described with reference to FIG. 11. FIG. 11 is a schematic plan view illustrating the head unit 20B according to the Embodiment 2. The head unit 20B illustrated in FIG. 11 is different from the head unit 20 of the Embodiment 1 in that fixation members 80B are disposed at different positions. Specifically, the fixation members 81B to 83B are disposed at different positions in the y-axis direction. In the description of the head unit 20B of the Embodiment 2, explanations of the same features as those in the liquid ejecting head 10 of the Embodiment 1 will be omitted.

The head unit 20B includes liquid ejecting heads 10E to 10H, a base member 22B, flexible members 70E to 70H, and fixation members 81B to 87B. The liquid ejecting heads 10E to 10H may be collectively referred to as the liquid ejecting heads 10 when the liquid ejecting heads 10E to 10H need not be distinguished from one another. The flexible members 70E to 70H may be collectively referred to as the flexible members 70 when the flexible members 70E to 70H need not be distinguished from one another. The fixation members 81B to 87B may be collectively referred to as the fixation members 80B when the fixation members 81B to 87B need not be distinguished from one another. The liquid ejecting head 10E represents an example of the first head. The liquid ejecting head 10F represents an example of the second head. The liquid ejecting head 10G represents an example of the third head. The flexible member 70E represents an example of the first flexible member. The flexible member 70F represents an example of the second flexible member. The flexible member 70G represents an example of the third flexible member. The fixation member 81B represents an example of the first fixation member. The fixation member 82B represents an example of the second fixation member.

The base member 22B holds the liquid ejecting heads 10 arranged in the x-axis direction. The fixation member 80B fixes the not-illustrated common flow channel member 30 to the base member 22B. The flexible members 70 are located between the liquid ejecting heads 10 and the common flow channel member 30 in the z-axis direction.

The flexible member 70E is disposed at a position overlapping the liquid ejecting head 10E when viewed in the z-axis direction. The flexible member 70F is disposed at a position overlapping the liquid ejecting head 10F when viewed in the z-axis direction. The flexible member 70G is disposed at a position overlapping the liquid ejecting head 10G when viewed in the z-axis direction. The flexible member 70H is disposed at a position overlapping the liquid ejecting head 10H when viewed in the z-axis direction.

The fixation member 81B is disposed at a position overlapping a gap G4 between the liquid ejecting head 10E and the liquid ejecting head 10F. The fixation member 82B is disposed at a position overlapping a gap G5 between the liquid ejecting head 10F and the liquid ejecting head 10G. The fixation member 83B is disposed at a position overlapping a gap G6 between the liquid ejecting head 10G and the liquid ejecting head 10H.

The fixation members 81B, 82B, and 83B are disposed at positions overlapping the flexible members 70 when viewed in the x-axis direction. The fixation member 82B is located in the y2 direction relative to the fixation members 81B and 83B. The fixation members 81B and 83B are disposed at positions close to the side wall 25 of the base member 22B. The fixation member 82B is disposed at a position close to the side wall 24.

The fixation member 84B is located at a corner position where the side wall 24 intersects with the side wall 27. The fixation member 85B is located at a corner position where the side wall 25 intersects with the side wall 27. The fixation member 86B is located at a corner position where the side wall 24 intersects with the side wall 26. The fixation member 87B is located at a corner position where the side wall 25 intersects with the side wall 26.

The fixation members 81B, 82B, and 83B are located in the y1 direction relative to the fixation members 84B and 86B and located in the y2 direction relative to the fixation members 85B and 87B. The fixation members 81B, 82B, and 83B are located in the x1 direction relative to the fixation members 84B and 85B and located in the x2 direction relative to the fixation members 86B and 87B.

In the head unit 20B according to the Embodiment 2, the liquid ejecting heads 10E to 10H are arranged in the x-axis direction, and the fixation members 81B and 83B are disposed at different positions from the fixation member 82B in the y-axis direction. The above-described head unit 20B according to the Embodiment 2 also exerts the same operation and effects as those of the head unit 20 according to the aforementioned Embodiment 1. The liquid ejecting apparatus 1 may be configured to include the head unit 20B instead of the head unit 20. In the head unit 20B, the fixation members 81B, 82B, and 83B are disposed in a region where the flexible members 70E to 70H are disposed. Accordingly, it is possible to suppress deformation of the flexible members 70E to 70H, thereby reducing the risk of ink leakage.

Figure 12:
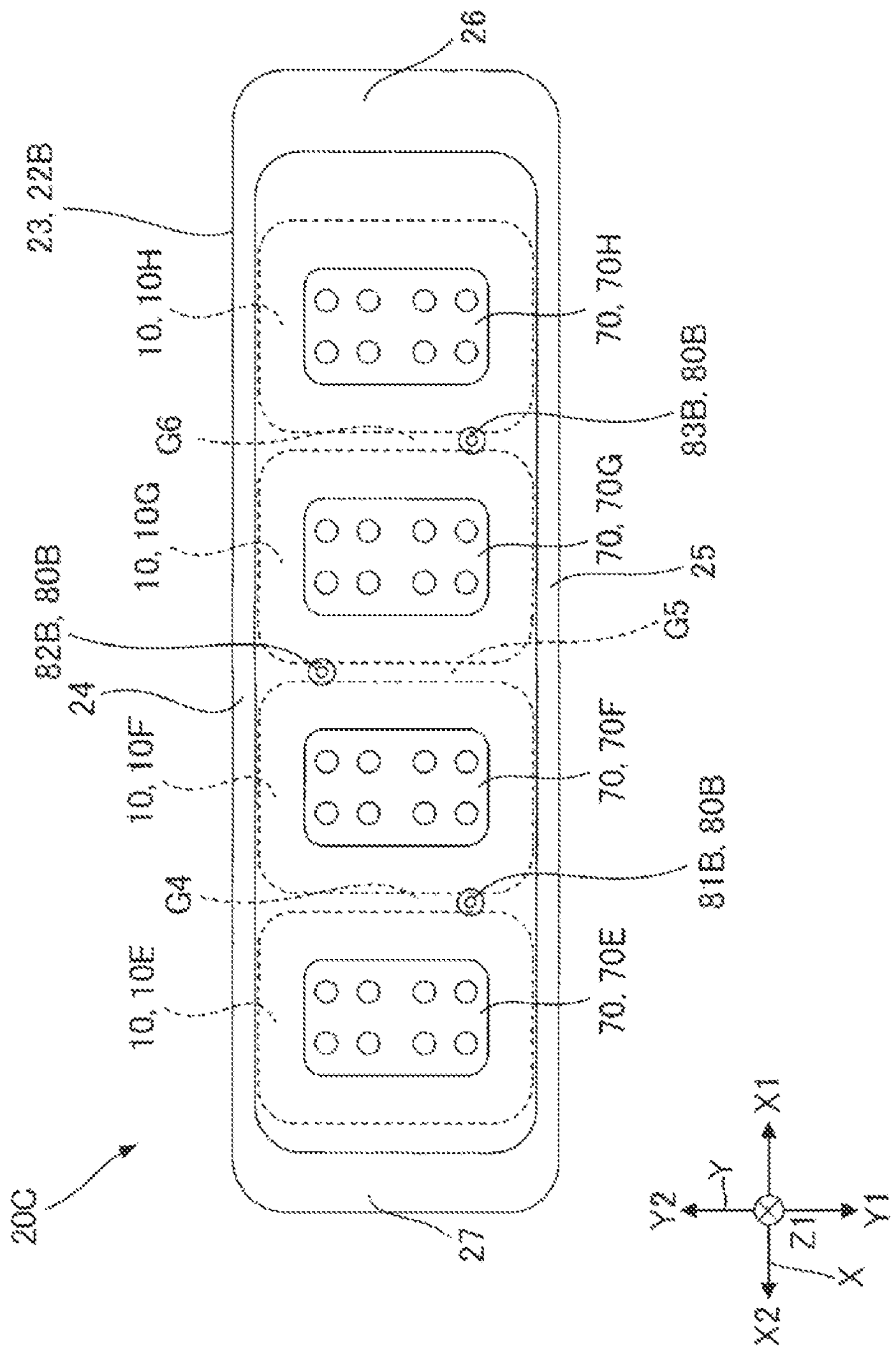
FIG. 12 is a schematic plan view illustrating a head unit according to Embodiment 3.

FIG. 12 is a schematic plan view illustrating a head unit 20C according to Embodiment 3. The head unit 20C illustrated in FIG. 12 is different from the head unit 20B of the Embodiment 2 in that the head unit 20C does not include the fixation members 84B, 85B, 86B, and 87B.

The above-described head unit 20C according to the Embodiment 3 also exerts the same operation and effects as those of the head unit 20B according to the aforementioned Embodiment 2. The liquid ejecting apparatus 1 may be configured to include the head unit 20C instead of the head unit 20. In the head unit 20C, it is possible to cause the fastening force of the fixation member 80B to evenly act on the liquid ejecting heads 10 while reducing the number of the fixation members 80B as compared to the head unit 20B.

Figure 13:
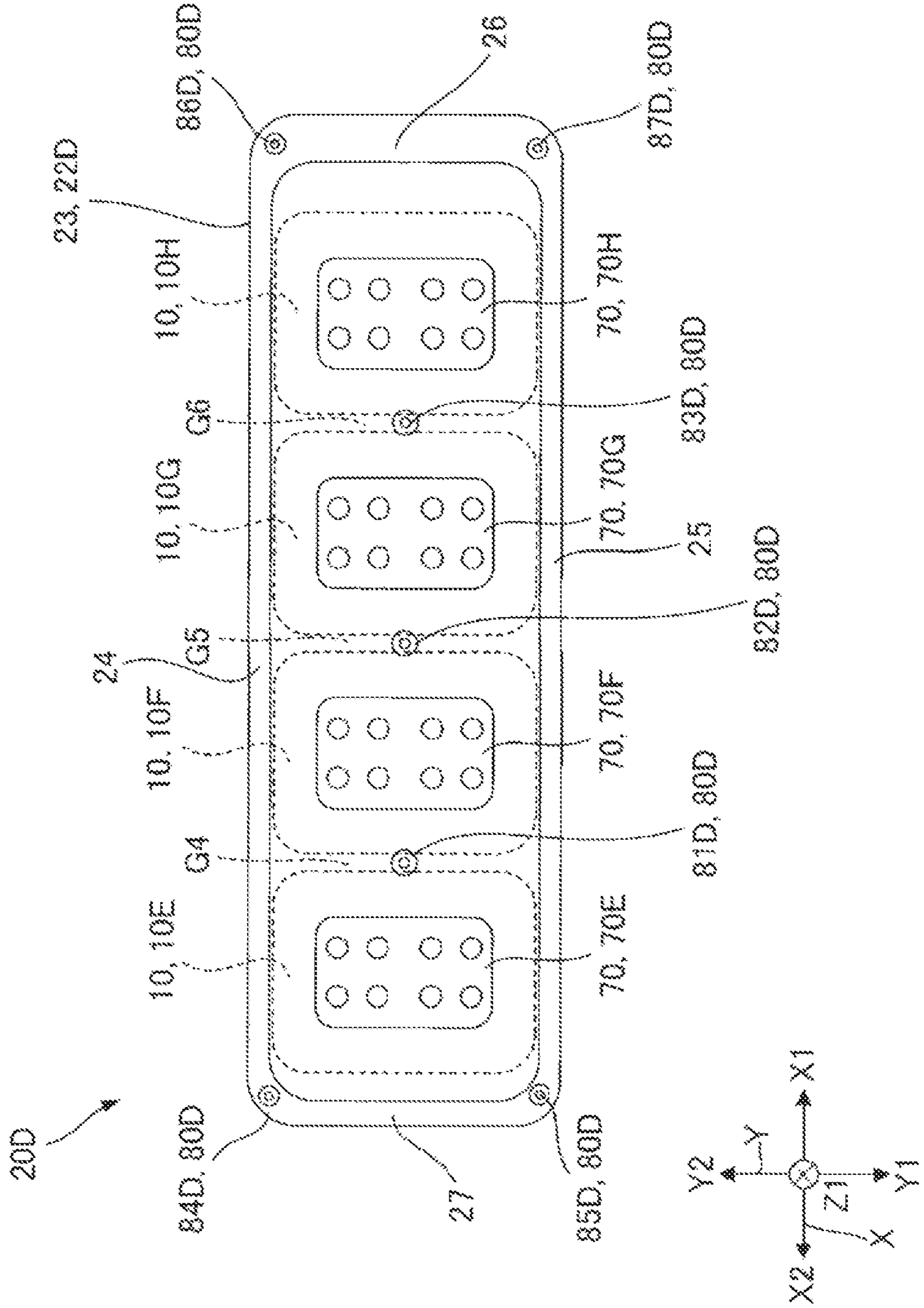
FIG. 13 is a schematic plan view illustrating a head unit according to Embodiment 4.

FIG. 13 is a schematic plan view illustrating a head unit 20D according to Embodiment 4. The head unit 20D illustrated in FIG. 13 is different from the head unit 20B of the Embodiment 2 in that fixation members 81D, 82D, and 83D are disposed at the same position in the y-axis direction, and that fixation members 84D, 85D, 86D, and 87D are smaller than the fixation members 81D, 82D, and 83D. The fixation member 81D represents an example of the first fixation member. The fixation member 82D represents an example of the second fixation member. Each of the fixation members 84D to 87D represents an example of the third fixation member.

In the head unit 20D, the fixation members 80D include the fixation members 84D, 85D, 86D, and 87D, which are disposed on the outside of the flexible members 70E to 70H in plan view. The fixation members 84D, 85D, 86D, and 87D are smaller than the fixation members 81D, 82D, and 83D in plan view. The above-described head unit 20D according to the Embodiment 4 also exerts the same operation and effects as those of the head unit 20B according to the aforementioned Embodiment 2. The liquid ejecting apparatus 1 may be configured to include the head unit 20D instead of the head unit 20. In the head unit 20D, the size of the frame portion 23 of a base member 22D can be reduced since the fixation members 84D, 85D, 86D, and 87D that are disposed on the outside of the flexible members 70E to 70H are smaller than the fixation members 81D, 82D, and 83D. For example, the lengths in the x-axis direction of the side walls 24 and 25 can be reduced. Thus, it is possible to downsize the head unit 20D.

Figure 14:
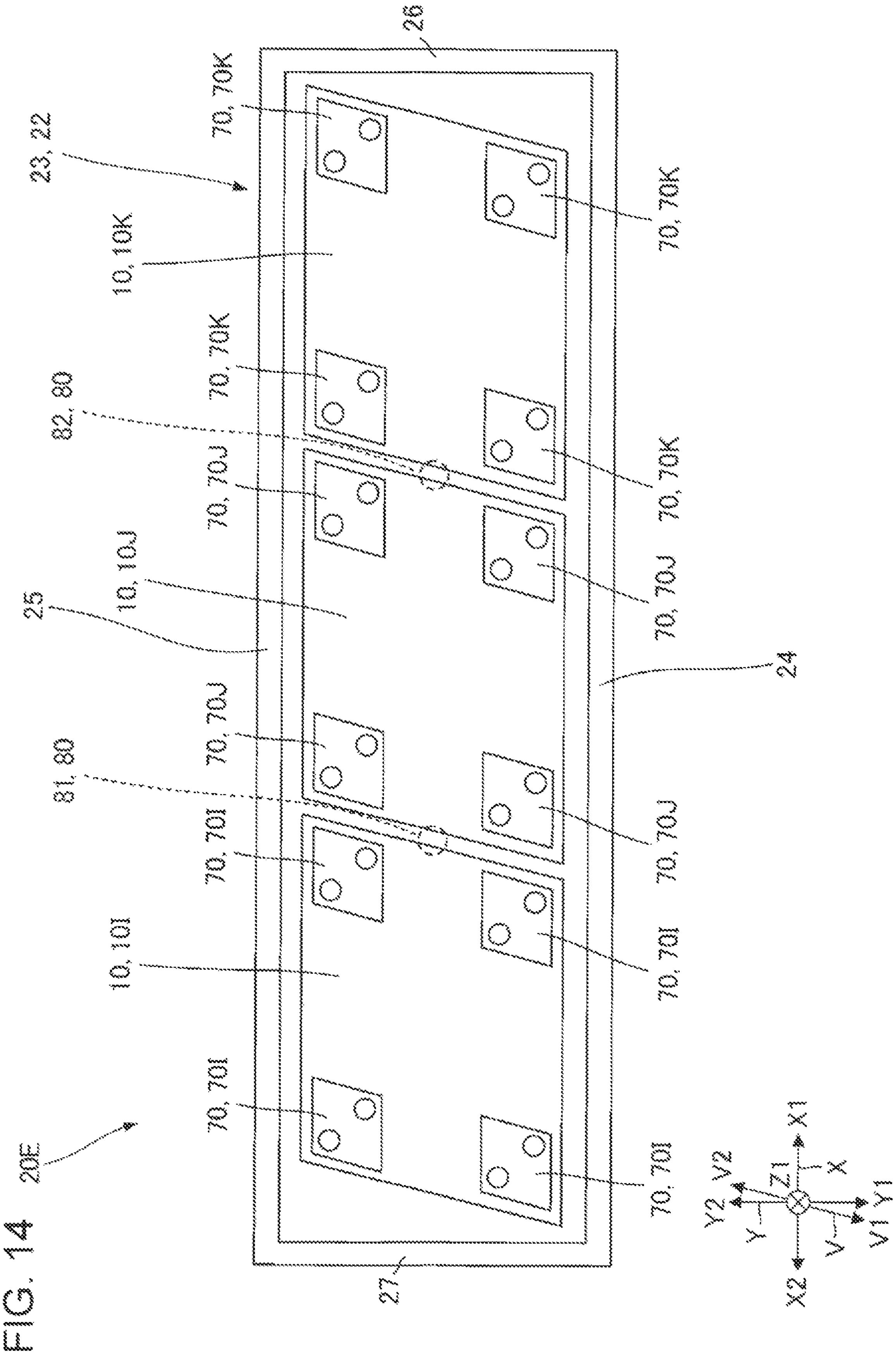
FIG. 14 is a schematic plan view illustrating a head unit according to Embodiment 5.

FIG. 14 is a schematic plan view illustrating a head unit 20E according to Embodiment 5. The head unit 20E illustrated in FIG. 14 is different from the head unit 20 of the Embodiment 1 in that the head unit 20E is configured to provide each liquid ejecting head 10 with the flexible members 70.

The head unit 20E includes the liquid ejecting heads 10, the flexible members 70, and the fixation members 80. The liquid ejecting heads 10 include the liquid ejecting heads 10I to 10K. The flexible members 70 include flexible members 70I to 70K. The liquid ejecting head 10I represents an example of the first head. The liquid ejecting head 10J represents an example of the second head. The liquid ejecting head 10K represents an example of the third head. The flexible member 70I represents an example of the first flexible member. The flexible member 70J represents an example of the second flexible member. The flexible member 70K represents an example of the third flexible member.

The liquid ejecting head 10I is provided with the flexible members 70I. The liquid ejecting head 10J is provided with the flexible members 70J. The liquid ejecting head 10K is provided with the flexible members 70K.

The fixation member 81 is located between the liquid ejecting head 10I and the liquid ejecting head 10J when viewed in the z-axis direction. The fixation member 81 is located between the flexible members 70 in the y-axis direction. The fixation member 82 is located between the liquid ejecting head 10J and the liquid ejecting head 10K when viewed in the z-axis direction. The fixation member 82 is located between the flexible members 70 in the y-axis direction. The fixation members 81 and 82 are located in a region where the flexible members 70 are disposed.

As described above, the head unit 20E may be configured to provide each liquid ejecting head 10 with the flexible members 70. In the head unit 20E, each liquid ejecting head 10 is provided with four flexible members 70.

Figure 15:
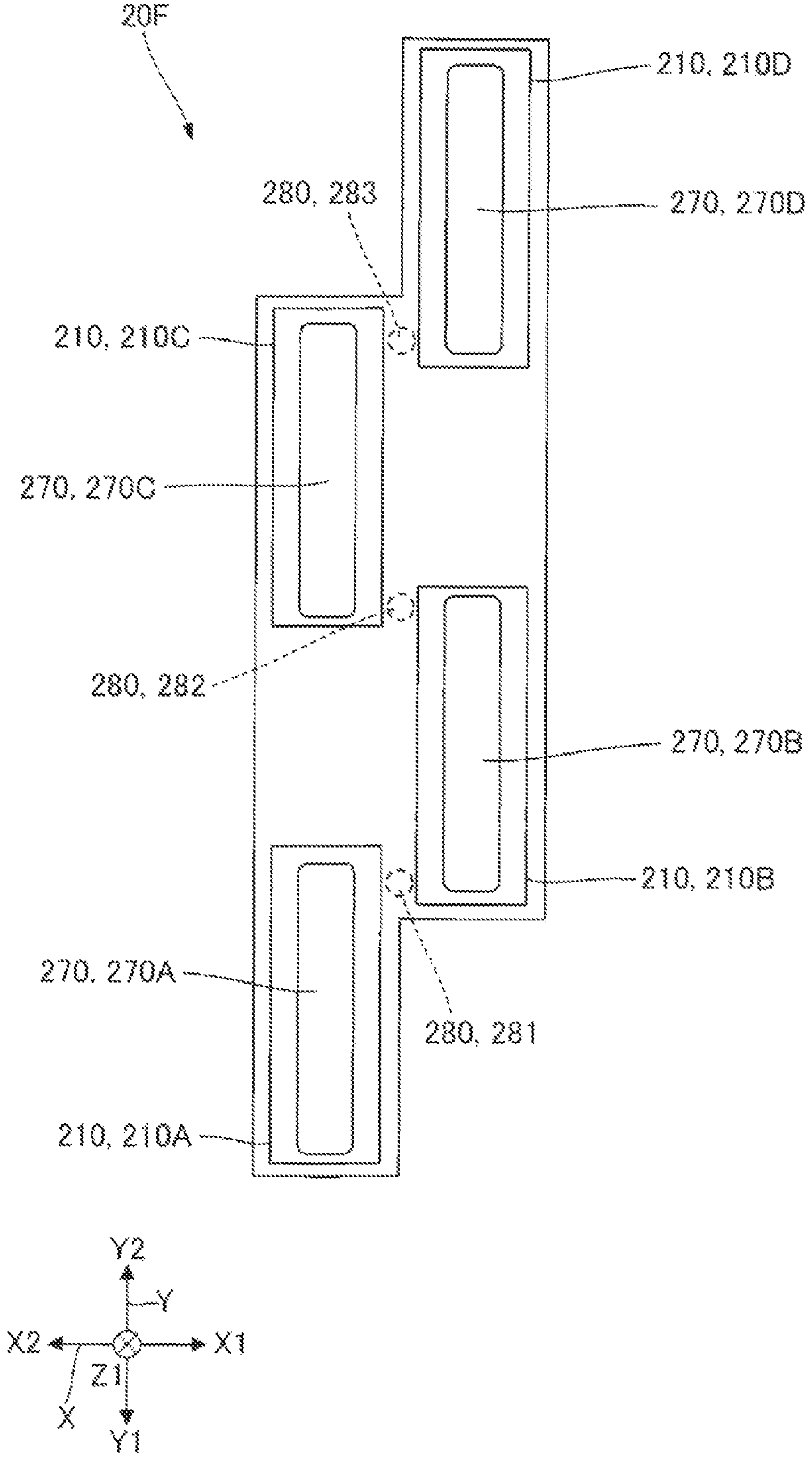
FIG. 15 is a schematic plan view illustrating a head unit according to Embodiment 6.

FIG. 15 is a schematic plan view illustrating a head unit 20F according to Embodiment 6. The head unit 20F includes heads 210, flexible members 270, and fixation members 280. The heads 210 include heads 210A to 210D. The flexible members 270 include flexible members 270A to 270D. The fixation members 280 include fixation members 281 to 283.

Each of the heads 210A to 210D is elongate in the y-axis direction. Each of the heads 210A to 210D includes the nozzles N. The heads 210A and 210C are located away from each other in the y-axis direction, and are disposed at the same position in the x-axis direction. The heads 210B and 210D are located away from each other in the y-axis direction, and are disposed at the same position in the x-axis direction. The heads 210B and 210D are located in the x1 direction relative to the heads 210A and 210C. Each of the heads 210A and 210C represents an example of the first head. Each of the heads 210B and 210D represents an example of the second head. Each of the flexible members 270A and 270C represents an example of the first flexible member. Each of the flexible members 270B and 270D represents an example of the second flexible member. Each of the fixation members 281 to 283 represents an example of the first fixation member.

An end portion in the y2 direction of the head 210A is disposed in such a way as to overlap an end portion in the y1 direction of the head 210B when viewed in the x-axis direction. An end portion in the y2 direction of the head 210B is disposed in such a way as to overlap an end portion in the y1 direction of the head 210C when viewed in the x-axis direction. An end portion in the y2 direction of the head 210C is disposed in such a way as to overlap an end portion in the y1 direction of the head 210D when viewed in the x-axis direction.

The fixation member 281 is located between the head 210A and the head 210B when viewed in the z-axis direction. The fixation member 281 is disposed in such a way as to overlap the head 210A and the head 210B when viewed in the x-axis direction. The fixation member 282 is located between the head 210B and the head 210C when viewed in the z-axis direction. The fixation member 282 is disposed in such a way as to overlap the head 210B and the head 210C when viewed in the x-axis direction. The fixation member 283 is located between the head 210C and the head 210D when viewed in the z-axis direction. The fixation member 283 is disposed in such a way as to overlap the head 210C and the head 210D when viewed in the x-axis direction.

As described above, the head unit 20F may be configured to include the heads 210 that are disposed in a staggered manner. According to the head unit 20F, the fixation members 280 are disposed between the heads 210 when viewed in the z-axis direction. Thus, it is possible to keep the flexible members 270 from floating upward, thereby maintaining the sealing performance and suppressing ink leakage.

Figure 16:
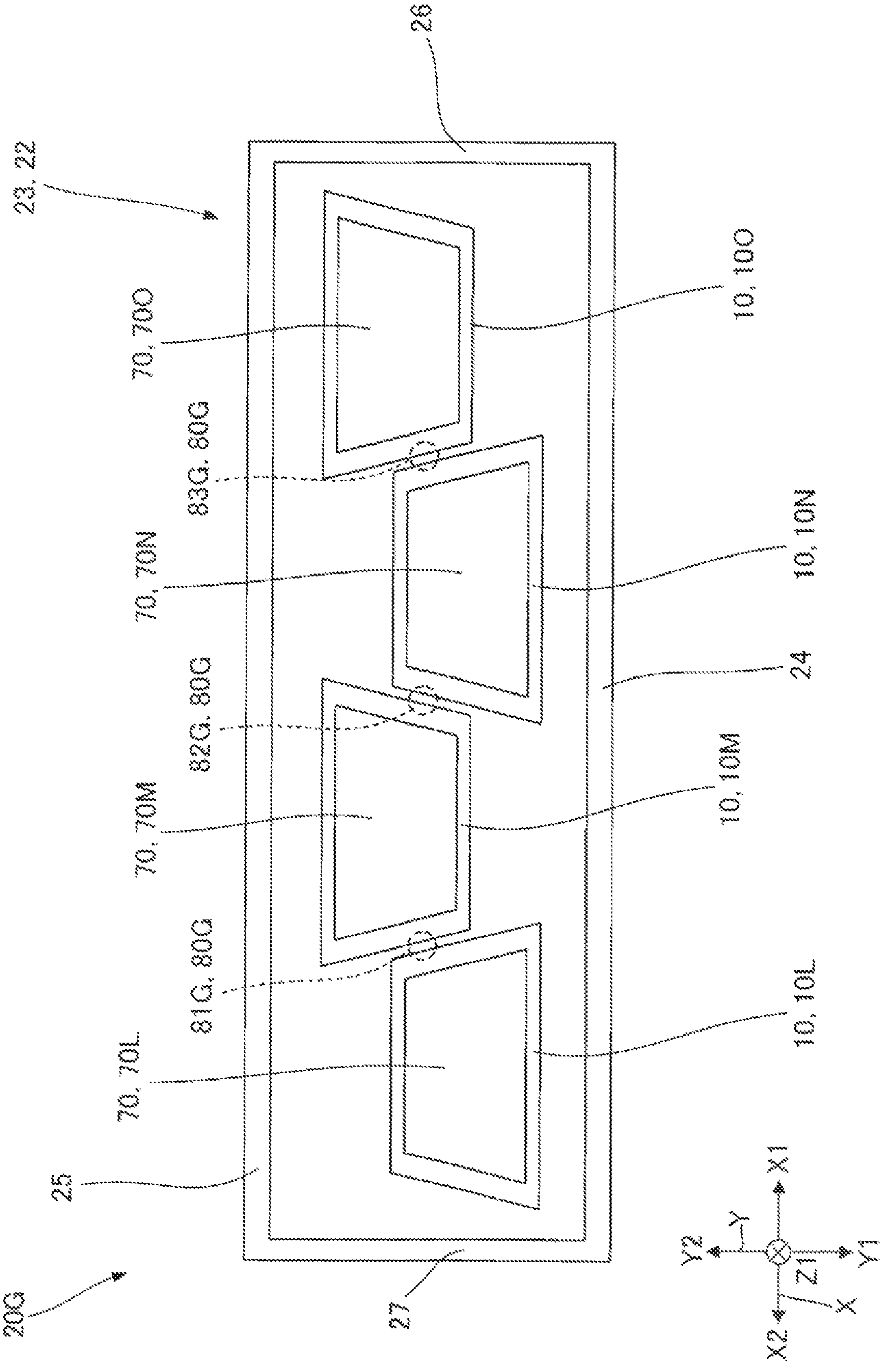
FIG. 16 is a schematic plan view illustrating a head unit according to Embodiment 7.

FIG. 16 is a schematic plan view illustrating a head unit 20G according to Embodiment 7. The head unit 20G includes the liquid ejecting heads 10, the flexible members 70, and fixation members 80G. The liquid ejecting heads 10 include liquid ejecting heads 10L to 10O. The flexible members 70 include flexible members 70L to 70O. The fixation members 80G include fixation members 81G to 83G. The liquid ejecting head 10L represents an example of the first head. The liquid ejecting head 10M represents an example of the second head. The liquid ejecting head 10N represents an example of the third head. The flexible member 70L represents an example of the first flexible member. The flexible member 70M represents an example of the second flexible member. The flexible member 70N represents an example of the third flexible member. The fixation member 81G represents an example of the first fixation member. The fixation member 82G represents an example of the second fixation member.

Each of the liquid ejecting heads 10L to 10O is formed into a trapezoidal shape when viewed in the z-axis direction. The line NL of nozzles in each of the liquid ejecting heads 10L to 10O extends in the x-axis direction. The liquid ejecting heads 10L to 10O are arranged in the x-axis direction. The liquid ejecting heads 10L and 10N are located away from each other in the x-axis direction, and are disposed at the same position in the y-axis direction. The liquid ejecting heads 10M and 10O are located away from each other in the x-axis direction, and are disposed at the same position in the y-axis direction. The liquid ejecting heads 10M and 10O are displaced in the y2 direction relative to the liquid ejecting heads 10L and 10N.

The flexible member 70L is disposed in such a way as to overlap the liquid ejecting head 10L when viewed in the z-axis direction. The flexible member 70M is disposed in such a way as to overlap the liquid ejecting head 10M when viewed in the z-axis direction. The flexible member 70N is disposed in such a way as to overlap the liquid ejecting head 10N when viewed in the z-axis direction. The flexible member 70O is disposed in such a way as to overlap the liquid ejecting head 10O when viewed in the z-axis direction.

The fixation member 81G is located between the liquid ejecting head 10L and the liquid ejecting head 10M when viewed in the z-axis direction. The fixation member 82G is located between the liquid ejecting head 10M and the liquid ejecting head 10N when viewed in the z-axis direction. The fixation member 83G is located between the liquid ejecting head 10N and the liquid ejecting head 10O when viewed in the z-axis direction. The fixation members 81G to 83G are disposed in such a way as to overlap the flexible members 70L to 70O when viewed in the x-axis direction.

According to the above-described head unit 20G, it is possible to keep the flexible members 70 from floating upward since the fixation members 80G are disposed between the liquid ejecting heads 10. This makes it possible to maintain the sealing performance and to suppress ink leakage.

The above-described embodiments merely depict the representative modes of the present disclosure, and the present disclosure is not limited only to the above-described embodiments. Various modifications and additions are possible within the range not departing from the gist of the present disclosure.

Modified Example 1

The head unit 20 according to the above-described Embodiment 1 shows the example in which the head unit 20 includes the common flow channel member 30 as illustrated in FIG. 5. However, the common flow channels 50 formed in the common flow channel member 30 are not limited thereto. For example, the common flow channels 50 may be formed straight in the x-axis direction. The common flow channels 50 need not be provided with the bypass portions 55A and 55B. For instance, the common flow channels 50A and 50B may be located away from each other in the y-axis direction. The fixation member 80 may be disposed in a gap between the common flow channels 50A and 50B located away from each other in the y-axis direction.

Modified Example 2

In the head unit 20 according to the above-described Embodiment 1, the number of the common flow channels 50 disposed in the y1 direction relative to the fixation member 80 (81, 82, or 83) is equal to the number of the common flow channels 50 disposed in the y2 direction relative to the fixation member 80 (81, 82, or 83). However, these numbers do not have to be equal.

Modified Example 3

The head unit 20 according to the above-described Embodiment 1 explains the case of fixing the fixation member 80 to the base member 22 that holds the liquid ejecting heads 10. However, the configuration of the fixation member 80 is not limited only to the foregoing. For example, the fixation member 80 may be directly fixed to the liquid ejecting head 10. Alternatively, the fixation member 80 may be fixed to another component that is attached to the liquid ejecting head 10. The fixation member 80 may be directly fixed to the liquid ejecting head 10 or indirectly fixed to the liquid ejecting head 10.

Modified Example 4

The head unit 20 according to the Embodiment 1 explains the case where the fixation member 80 is fixed to the joining portion 28 of the base member 22. Instead, the fixation member 80 may be fixed a different portion of the base member 22. For instance, the base member 22 may include a protrusion that protrudes into the region where the flexible members 70 are disposed, and the fixation member 80 may be fixed to the protrusion.

Modified Example 5

The head unit 20 of the Embodiment 1 explains the case where the fixation members 80 are disposed in all of the gaps between the flexible members 70. However, the fixation members 80 do not have to be disposed in all of the gaps between the flexible members 70. For example, the fixation member 80 may be provided corresponding to at least one of the gaps. Meanwhile, the fixation members 80 may be disposed in some the gaps between the flexible members 70.

Modified Example 6

The head unit 20 of the Embodiment 1 explains the case where the fixation members 80 are disposed in all of the gaps G1 to G3 between the liquid ejecting heads 10. However, the fixation members 80 do not have to be disposed in all of the gaps G1 to G3. For example, the fixation members 80 may be disposed in the gaps G1 and G3 without disposing the fixation member 80 in the gap G2. Meanwhile, two or more fixation members 80 may be disposed in any of the gaps G1 to G3. For instance, two fixation members 80 may be disposed in the gap G1.

Modified Example 7

The head unit 20 of the Embodiment 1 shows the example of the case of disposing the fixation member 80 at the position overlapping the gap G1 between the liquid ejecting heads 10 when viewed in the z-axis direction. However, the configuration of the fixation member 80 is not limited only to the foregoing. The fixation member 80 may be disposed at a position overlapping any of the liquid ejecting heads 10 instead of the position overlapping the gap G1.

Modified Example 8

The head unit 20 of the Embodiment 1 explains the case of providing the fixation member 80 in such a way as to penetrate the common flow channel member 30. Here, the fixation member 80 may penetrate one of the common flow channel substrates 31 and 32. The fixation member 80 may fix another member together with the common flow channel member 30. For example, the fixation member 80 may penetrate the relay board 41 to be stacked on the common flow channel member 30. The fixation member 80 may fix the relay board 41 and the common flow channel member 30 to the base member 22, and fix the flexible member 70 by pressing the common flow channel member 30 against the liquid ejecting head 10.

Modified Example 9

The head unit 20 of the Embodiment 1 shows the example of providing the base member 22 with the supporting portions 29 and disposing the flexible members 70 on the supporting portions 29. However, the base member 22 does not have to be provided with the supporting portions 29. For example, the flexible members 70 may be disposed on the liquid ejecting heads 10.

Modified Example 10

In the Embodiment 1, the common flow channel member 30 is provided with the eight flow channel pipes 35 in total, namely, the four flow channel pipes 35 to be coupled to the four supply flow channels 7, and the four flow channel pipes 35 to be coupled to the four discharge flow channels 8. However, the number of the flow channel pipes 35 may be equal to or less the seven or equal to or more than nine. In other words, the number of the common flow channels 50 may be equal to or less the seven or equal to or more than nine. Instead of the flow channel pipes 35, the common flow channel member 30 may be provided with flow channel holes that allow insertion of the supply flow channels 7 and the discharge flow channels 8 being flow channel members on the outside of the head unit 20. In addition, all of the flow channel pipes 35 provided to the common flow channel member 30 may be coupled to the supply flow channels 7. In other words, the ink does not always have to be circulated in the head unit 20.

The head unit 20 according to the above-described embodiments explains the case of being provided with the liquid ejecting heads 10. Here, the head unit 20 only needs to include at least two liquid ejecting heads 10. The head unit 20 may include equal to or more than five liquid ejecting heads 10, for example.

The above-described embodiments show the example of the liquid ejecting apparatus 1 of the line type provided with the line head 6. The present disclosure may also be applied to a liquid ejecting apparatus of a serial type which causes a carriage on which the liquid ejecting heads 10 are mounted to reciprocate in the width direction of the medium PA.

Besides the apparatus dedicated to printing, the liquid ejecting apparatus 1 shown as the example in the above-described embodiments may also be adopted as various apparatuses including a facsimile apparatus, a copier, and the like. As a matter of fact, the usage of the liquid ejecting apparatus of the present disclosure is not limited only to printing. For example, a liquid ejecting apparatus that ejects a solution of a coloring material is used as a manufacturing apparatus for forming a color filter of a display device such as a liquid crystal display panel. A liquid ejecting apparatus that ejects a solution of a conductive material is used as a manufacturing apparatus for forming wiring and electrodes on a wiring board. A liquid ejecting apparatus that ejects a solution of an organic substance related to a biological object is used as a manufacturing apparatus for manufacturing a biochip, for instance.

What is claimed is:

1. A head unit comprising:

heads including
- a first head including a first flow channel, and
- a second head located adjacent to the first head and including a second flow channel;

a common flow channel member being stacked on the heads and including common flow channels including a first common flow channel that communicates with the first and second flow channels;

flexible members including
- a first flexible member disposed between the first head and the common flow channel member, and
- a second flexible member disposed between the second head and the common flow channel member; and fixation members for fixing the common flow channel member, the first and second heads, and the first and second flexible members together, wherein the first flexible member establishes liquid-tight communication between the first flow channel and the first common flow channel by being compressed in a stacking direction of the heads and the common flow channel member, the second flexible member establishes liquid-tight communication between the second flow channel and the first common flow channel by being compressed in the stacking direction, and the fixation members include a first fixation member disposed between the first flexible member and the second flexible member in plan view being viewed in the stacking direction.

2. The head unit according to claim 1, wherein the heads include a third head located adjacent to the second head and including a third flow channel, the flexible members include a third flexible member that is disposed between the third head and the common flow channel member, and establishes liquid-tight communication between the third flow channel and the first common flow channel by being compressed in the stacking direction, and the fixation members include a second fixation member disposed between the second flexible member and the third flexible member in the plan view.

3. The head unit according to claim 2, wherein the first to third heads are arranged in a first direction, and the first fixation member and the second fixation member are disposed at different positions in a second direction being orthogonal to both the first direction and the stacking direction.

4. The head unit according to claim 1, wherein the first fixation member overlaps a gap between the first head and the second head in the plan view.

5. The head unit according to claim 1, wherein the first and second heads are arranged in a first direction, the first common flow channel extends in the first direction, the common flow channel member includes a fixation hole into which the first fixation member is inserted, and the first common flow channel includes a first bypass portion that is bent in such a way as to bypass the fixation hole between the first flexible member and the second flexible member in the plan view.

6. The head unit according to claim 5, wherein the common flow channels include a second common flow channel being different from the first common flow channel and extending in the first direction, the second common flow channel includes a second bypass portion that is bent in such a way as to bypass the fixation hole between the first flexible member and the second flexible member in the plan view, and the fixation hole is pinched between the first bypass portion and the second bypass portion in the plan view.

7. The head unit according to claim 6, wherein the common flow channels are adjacent to each other in a second direction being orthogonal to both the first direction and the stacking direction, and a dimension in the first direction of a region, in which the first fixation member is disposed and which is surrounded by the common flow channels adjacent to each other, is larger than a dimension of the region in the second direction.

8. The head unit according to claim 1, further comprising;

a base member that holds the first and second heads, wherein in the plan view, an outer shape of the first flexible member is smaller than an outer shape of the first head, and an outer shape of the second flexible member is smaller than an outer shape of the second head, the base member includes a frame portion including a first side wall and a second side wall located away from each other, and a joining portion extending between the first flexible member and the second flexible member in such a way as to couple the first side wall to the second side wall, and the first fixation member directly fixes the joining portion to the common flow channel member.

9. The head unit according to claim 8, wherein the base member further includes:

a first supporting portion on which the first flexible member is mounted; and a second supporting portion on which the second flexible member is mounted.

10. The head unit according to claim 1, wherein the fixation member includes a screw.

11. The head unit according to claim 1, wherein the head unit is a line head formed by arranging the heads in a first direction.

12. The head unit according to claim 1, wherein the fixation members include a third fixation member disposed on outside of the flexible members in the plan view, and the first fixation member is smaller than the third fixation member in the plan view.

13. The head unit according to claim 1, wherein the fixation members include a third fixation member disposed on outside of the flexible members in the plan view, and the third fixation member is smaller than the first fixation member in the plan view.

14. The head unit according to claim 1, wherein the first head includes first flow channel couplers to be coupled to the common flow channels, the second head includes second flow channel couplers to be coupled to the common flow channels, and the first fixation member is disposed between a first region surrounding the first flow channel couplers and a second region surrounding the second flow channel couplers when viewed in the stacking direction.

15. A liquid ejecting apparatus comprising:

the head unit according to claim 1; and a flow channel member on outside of the head unit.

* * * * *